(12) United States Patent
Baker et al.

(10) Patent No.: US 11,964,627 B2
(45) Date of Patent: Apr. 23, 2024

(54) METHODS AND APPARATUS FOR SUPPORTING COMPARTMENT INSERTS IN AUTONOMOUS DELIVERY VEHICLES

(71) Applicant: Nuro, Inc., Mountain View, CA (US)

(72) Inventors: Brian Alan Baker, San Francisco, CA (US); Robert Irving Luan, San Jose, CA (US); Benjamin Wade Julian, San Francisco, CA (US); Riley Alexander Soward, San Francisco, CA (US)

(73) Assignee: Nuro, Inc., Mountain View, CA (US)

( * ) Notice: Subject to any disclaimer, the term of this patent is extended or adjusted under 35 U.S.C. 154(b) by 723 days.

(21) Appl. No.: 17/023,222

(22) Filed: Sep. 16, 2020

(65) Prior Publication Data

US 2021/0094506 A1    Apr. 1, 2021

Related U.S. Application Data

(60) Provisional application No. 62/907,875, filed on Sep. 30, 2019.

(51) Int. Cl.
*G06F 7/00*    (2006.01)
*B60R 25/01*    (2013.01)
(Continued)

(52) U.S. Cl.
CPC ............ *B60R 25/01* (2013.01); *B60R 25/241* (2013.01); *G05D 1/0212* (2013.01);
(Continued)

(58) Field of Classification Search
CPC ......... B60R 25/01; B60R 25/241; B60R 5/02; B60R 5/04; B60R 16/03; G05D 1/0212;
(Continued)

(56) References Cited

U.S. PATENT DOCUMENTS 3,064,252 A    11/1962    Varela
4,766,548 A    8/1988    Cedrone et al.
(Continued)

FOREIGN PATENT DOCUMENTS

JP    H036407 A    1/1991
JP    2001256576 A    9/2001
(Continued)

OTHER PUBLICATIONS

Sproewitz, Alexander, et al., "An active connection mechanism for modular self-reconfigurable robotic systems based on physical latching", DOI:10.1109/ROBOT.2008.4543747Corpus ID: 173795 (https://www.semanticscholar.org/paper/An-active-connection-mechanism-for-modular-robotic-Spr%C3%B6witz-Asadpour/f5339ef11486567113cd06c6b26652a910bbff54), 2008.
(Continued)

*Primary Examiner* — Adam M Alharbi

(57) ABSTRACT

According to one aspect, a method includes detecting, through a detection interface of a vehicle, an installation of a first compartment insert in a first compartment of the vehicle, wherein detecting the installation includes determining when the detection interface is in contact with a second interface of the first compartment insert. After detecting the installation of the first compartment insert, it is determined whether the first compartment insert is capable of transmitting information to the vehicle. The method also includes obtaining the information from the first compartment insert when it is determined that the first compartment insert is capable of transmitting the information to the vehicle, and identifying a type associated with the first compartment insert from the information.

14 Claims, 17 Drawing Sheets

(51) Int. Cl.
*B60R 25/24* (2013.01)
*G05D 1/00* (2006.01)
*G06Q 10/0631* (2023.01)
*G06Q 10/08* (2023.01)
*G06Q 30/018* (2023.01)
*B60P 3/00* (2006.01)
*B60R 5/02* (2006.01)
*B60R 5/04* (2006.01)
*B60R 16/03* (2006.01)

(52) U.S. Cl.
CPC ....... *G06Q 10/06315* (2013.01); *G06Q 10/08* (2013.01); *G06Q 30/0185* (2013.01); *B60P 3/007* (2013.01); *B60R 5/02* (2013.01); *B60R 5/04* (2013.01); *B60R 16/03* (2013.01); *G05D 1/021* (2013.01); *G06Q 2240/00* (2013.01)

(58) Field of Classification Search
CPC ............. G05D 1/021; G06Q 10/06315; G06Q 30/0185; G06Q 50/28; G06Q 2240/00; B60P 3/007
See application file for complete search history.

(56) References Cited

U.S. PATENT DOCUMENTS

| | | |
|---|---|---|
| 4,952,911 A | 8/1990 | D'Ambrosia et al. |
| 5,128,861 A | 7/1992 | Kagami et al. |
| 5,179,843 A | 1/1993 | Cohausz |
| 5,207,784 A | 5/1993 | Schwartzendruber |
| 5,636,122 A | 6/1997 | Shah et al. |
| 5,844,808 A | 12/1998 | Konsmo et al. |
| 5,877,688 A | 3/1999 | Morinaka et al. |
| D411,814 S | 7/1999 | Chibuka et al. |
| 5,922,040 A | 7/1999 | Prabhakaran |
| 6,021,394 A | 2/2000 | Takahashi |
| 6,034,803 A | 3/2000 | Sullivan et al. |
| 6,181,981 B1 | 1/2001 | Varga et al. |
| 6,230,150 B1 | 5/2001 | Walker et al. |
| 6,323,941 B1 | 11/2001 | Evans et al. |
| 6,571,150 B2 | 5/2003 | Arai et al. |
| 6,609,101 B1 | 8/2003 | Landvater |
| 6,636,598 B1 | 10/2003 | Thomson et al. |
| 7,030,968 B2 | 4/2006 | D'Aligny et al. |
| 7,051,539 B2 | 5/2006 | Junge et al. |
| 7,139,721 B2 | 11/2006 | Borders et al. |
| 7,177,825 B1 | 2/2007 | Borders et al. |
| 7,190,465 B2 | 3/2007 | Froehlich et al. |
| 7,227,116 B2 | 6/2007 | Gleckler et al. |
| 7,281,891 B2 | 10/2007 | Smith et al. |
| 7,521,935 B2 | 4/2009 | Uchida |
| 7,534,984 B2 | 5/2009 | Gleckler |
| D615,905 S | 5/2010 | Arnell |
| 7,798,885 B2 | 9/2010 | Wong et al. |
| 7,944,548 B2 | 5/2011 | Eaton |
| 8,072,581 B1 | 12/2011 | Breiholz |
| 8,191,779 B2 | 6/2012 | Illingworth et al. |
| 8,326,707 B2 | 12/2012 | Fan et al. |
| 8,630,897 B1 | 1/2014 | Prada Gomez et al. |
| 8,675,184 B2 | 3/2014 | Schmitt et al. |
| 8,788,341 B1 | 7/2014 | Patel et al. |
| 8,836,922 B1 | 9/2014 | Pennecot et al. |
| 8,862,388 B2 | 10/2014 | Wu et al. |
| 8,989,053 B1 | 3/2015 | Skaaksrud et al. |
| D734,211 S | 7/2015 | Ahn et al. |
| 9,086,273 B1 | 7/2015 | Gruver et al. |
| 9,147,192 B2 | 9/2015 | Dawson et al. |
| 9,230,236 B2 | 1/2016 | Villamar |
| 9,256,852 B1 | 2/2016 | Myllymaki |
| 9,307,383 B1 | 4/2016 | Patrick |
| D755,673 S | 5/2016 | Ahn et al. |
| 9,383,753 B1 | 7/2016 | Templeton et al. |
| 9,488,984 B1 | 11/2016 | Williams et al. |
| 9,489,490 B1 | 11/2016 | Theobald |
| 9,552,564 B1 | 1/2017 | Martenis |
| 9,613,346 B2 | 4/2017 | Crow et al. |
| 9,684,914 B1 | 6/2017 | Porter et al. |
| 9,741,010 B1 | 8/2017 | Heinla |
| 9,786,187 B1 | 10/2017 | Bar-Zeev et al. |
| 9,815,633 B1 | 11/2017 | Kisser et al. |
| 9,824,394 B1 | 11/2017 | Boates et al. |
| 9,905,133 B1 | 2/2018 | Kumar et al. |
| 9,916,703 B2 | 3/2018 | Levinson et al. |
| 9,984,525 B2 | 5/2018 | Will et al. |
| 10,029,787 B1 | 7/2018 | Lesser et al. |
| 10,120,384 B2 | 11/2018 | Wilkinson et al. |
| 10,245,993 B1* | 4/2019 | Brady ................. B60P 7/13 |
| 2002/0023594 A1 | 2/2002 | Greene |
| 2003/0209375 A1 | 11/2003 | Suzuki et al. |
| 2004/0181570 A1 | 9/2004 | Kaneko |
| 2004/0225954 A1 | 11/2004 | Maloney |
| 2005/0043011 A1 | 2/2005 | Murray et al. |
| 2005/0060246 A1 | 3/2005 | Lastinger et al. |
| 2006/0106490 A1 | 5/2006 | Howell et al. |
| 2007/0182818 A1 | 8/2007 | Buehler |
| 2007/0235465 A1 | 10/2007 | Walker et al. |
| 2010/0219953 A1 | 9/2010 | Bloy |
| 2010/0234991 A1 | 9/2010 | Zini et al. |
| 2010/0301056 A1 | 12/2010 | Wolfe |
| 2011/0130134 A1 | 6/2011 | Van Rysselberghe |
| 2011/0313811 A1 | 12/2011 | Urban et al. |
| 2012/0059729 A1 | 3/2012 | Roa et al. |
| 2012/0078553 A1 | 3/2012 | Kuroda et al. |
| 2012/0173747 A1 | 7/2012 | Roesch et al. |
| 2012/0185130 A1 | 7/2012 | Ekchian et al. |
| 2013/0061044 A1 | 3/2013 | Pinkus et al. |
| 2013/0282472 A1 | 10/2013 | Penilla et al. |
| 2013/0307698 A1 | 11/2013 | Park et al. |
| 2014/0022051 A1 | 1/2014 | Levien et al. |
| 2014/0136414 A1 | 5/2014 | Abhyanker |
| 2014/0209634 A1 | 7/2014 | Metropulos et al. |
| 2014/0316561 A1 | 10/2014 | Tkachenko et al. |
| 2014/0330739 A1 | 11/2014 | Falcone et al. |
| 2014/0344608 A1 | 11/2014 | Wang et al. |
| 2014/0358353 A1 | 12/2014 | Ibanez-Guzman et al. |
| 2014/0380264 A1 | 12/2014 | Misra et al. |
| 2015/0006005 A1 | 1/2015 | Yu et al. |
| 2015/0120094 A1 | 4/2015 | Kimchi et al. |
| 2015/0134546 A1 | 5/2015 | Penilla et al. |
| 2015/0149015 A1 | 5/2015 | Nakano et al. |
| 2015/0154538 A1 | 6/2015 | Skaaksrud |
| 2015/0170099 A1 | 6/2015 | Beach-Drummond |
| 2015/0348112 A1 | 12/2015 | Ramanujam |
| 2016/0018224 A1 | 1/2016 | Isler et al. |
| 2016/0033966 A1 | 2/2016 | Farris et al. |
| 2016/0062583 A1 | 3/2016 | Ricci |
| 2016/0071052 A1 | 3/2016 | Henry et al. |
| 2016/0098871 A1 | 4/2016 | Oz et al. |
| 2016/0247109 A1 | 8/2016 | Scicluna et al. |
| 2016/0286627 A1 | 9/2016 | Chen |
| 2016/0300187 A1 | 10/2016 | Kashi et al. |
| 2016/0334797 A1 | 11/2016 | Ross et al. |
| 2016/0357187 A1 | 12/2016 | Ansari |
| 2016/0357188 A1 | 12/2016 | Ansari |
| 2016/0358477 A1 | 12/2016 | Ansari |
| 2016/0363991 A1 | 12/2016 | Schlecht et al. |
| 2017/0011580 A1 | 1/2017 | Huang et al. |
| 2017/0057516 A1 | 3/2017 | Gordon et al. |
| 2017/0075355 A1 | 3/2017 | Micks et al. |
| 2017/0090480 A1 | 3/2017 | Ho et al. |
| 2017/0115125 A1 | 4/2017 | Outwater et al. |
| 2017/0124547 A1 | 5/2017 | Natarajan et al. |
| 2017/0124781 A1 | 5/2017 | Douillard et al. |
| 2017/0132934 A1 | 5/2017 | Kentley et al. |
| 2017/0132960 A1 | 5/2017 | Kis-Benedek Pinero |
| 2017/0153714 A1 | 6/2017 | Gao et al. |
| 2017/0193434 A1 | 7/2017 | Shah et al. |
| 2017/0227962 A1 | 8/2017 | Cesarano et al. |
| 2017/0248964 A1 | 8/2017 | Kentley et al. |
| 2017/0255198 A1 | 9/2017 | Rodriguez |
| 2017/0261977 A1 | 9/2017 | High et al. |
| 2017/0262790 A1 | 9/2017 | Khasis |
| 2017/0282859 A1 | 10/2017 | Grimm et al. |

(56) References Cited

U.S. PATENT DOCUMENTS

| | | |
|---|---|---|
| 2017/0313421 A1 | 11/2017 | Gil |
| 2017/0323253 A1 | 11/2017 | Enssle et al. |
| 2018/0024554 A1 | 1/2018 | Brady et al. |
| 2018/0025635 A1 | 1/2018 | Cheaz et al. |
| 2018/0033308 A1 | 2/2018 | Litkouhi et al. |
| 2018/0053147 A1 | 2/2018 | Zhang et al. |
| 2018/0053369 A1 | 2/2018 | High et al. |
| 2018/0053423 A1 | 2/2018 | Dacosta et al. |
| 2018/0068253 A1 | 3/2018 | Simms et al. |
| 2018/0082343 A1 | 3/2018 | Gordon et al. |
| 2018/0099602 A1 | 4/2018 | Salter et al. |
| 2018/0101818 A1 | 4/2018 | Simms et al. |
| 2018/0157984 A1 | 6/2018 | O'Herlihy et al. |
| 2018/0165728 A1 | 6/2018 | McDonald et al. |
| 2018/0189716 A1 | 7/2018 | Crone |
| 2018/0194411 A1 | 7/2018 | Liivik et al. |
| 2018/0196416 A1 | 7/2018 | Iagnemma |
| 2018/0196417 A1 | 7/2018 | Iagnemma |
| 2018/0211541 A1 | 7/2018 | Rakah et al. |
| 2018/0232839 A1 | 8/2018 | Heinla et al. |
| 2018/0253108 A1 | 9/2018 | Heinla et al. |
| 2018/0260778 A1 | 9/2018 | Mazetti et al. |
| 2018/0260780 A1 | 9/2018 | Mazetti |
| 2018/0330313 A1 | 11/2018 | Clarke et al. |
| 2018/0349872 A1 | 12/2018 | Ahmed et al. |
| 2018/0373246 A1 | 12/2018 | Laughlin et al. |
| 2018/0374002 A1 | 12/2018 | Li |
| 2019/0023236 A1 | 1/2019 | Webb |
| 2019/0033883 A1 | 1/2019 | Ferguson et al. |
| 2019/0049988 A1* | 2/2019 | Meij .................. G05D 1/0274 |
| 2019/0180236 A1* | 6/2019 | Greenberger ........ G05D 1/0291 |

FOREIGN PATENT DOCUMENTS

| | | |
|---|---|---|
| JP | 2006177843 A | 7/2006 |
| WO | 2013/025803 A1 | 2/2013 |
| WO | 2017/014544 A1 | 1/2017 |
| WO | 2019/018695 A1 | 1/2019 |
| WO | 2019/023518 A1 | 1/2019 |
| WO | 2019/023519 A1 | 1/2019 |
| WO | 2019/023521 A1 | 1/2019 |
| WO | 2019/023522 A1 | 1/2019 |
| WO | 2019/023615 A1 | 1/2019 |
| WO | 2019023686 A1 | 1/2019 |

OTHER PUBLICATIONS

American National Standard for Safe Use of Lasers, ANSI ZI136.1-2000 (§4.5.1.5; 4.5.1.3-4 and p. 5), 19 pages (2000).
AN/TPS-43 Radar System, Westinghouse (pp. 3, 4, 6, 9 & 14), 14 pages (2007).
Food and Drugs Rule—Performance Standards for Light-Emitting Products, 21 C.F.R. § 1040.10, 19 pages (2005).
Chen, Xiaozhi et al. "3D object proposals for accurate object class detection," Advances in Neural Information Processing Systems (NIPS), pp. 424-432 (2015).
Chen, Xiaozhi et al. "Monocular 3D object detection for autonomous driving," Proceedings of the IEEE Conference on Computer Vision and Pattern Recognition, pp. 2147-2156 (2016).
Chen, Xiaozhi et al. "Multi-view 3D object detection network for autonomous driving," IEEE Conference on Computer Vision and Pattern Recognition (CVPR), pp. 1907-1915 (2017).
Curtis, Sophie "Skype founders invent self-driving robot that can deliver groceries for £1," https://www.telegraph.co.uk/technology/news/11962566/Skype-founders-invent-self-driving-robot-that-can-deliver-groceries-for-1.html, 3 pages (Nov. 2, 2015).
Deng, Zhuo et al. "Amodal detection of 3D objects: Inferring 3D bounding boxes from 2D ones in RGB-depth images," Conference on Computer Vision and Pattern Recognition (CVPR), INSPEC Accession No. 17355643 (Jul. 21-26, 2017).

Engelcke, Martin, et al. "Vote3deep: Fast object detection in 3D point clouds using efficient convolutional neural networks," 2017 IEEE International Conference on Robotics and Automation (ICRA), pp. 1355-1361 (2017).
Fox, Clifton, In: Active Electro-Optical Systems (The Infrared & Electro-Optical Systems Handbook, vol. 6), ISBN 0-8194-1072-1, 326 pages (1993).
Geiger, Andreas, et al. "Vision meets robotics: The KITTI dataset," The International Journal of Robotics Research 32(11):1231-7 (2013).
Girshick, Ross, et al. "Rich feature hierarchies for accurate object detection and semantic segmentation," Proceedings of the IEEE Conference on Computer Vision and Pattern Recognition, pp. 580-587 (2014).
Gustavson, Robert, et al. "Diode-laser radar for low cost weapon guidance," In: Laser Radar VII: Advanced Technology for Applications, vol. 1633, Intl. Society for Optics and Photonics, pp. 21-32 (1992).
Kawata, Hirohiko, et al. "Development of ultra-small lightweight optical range sensor systems," 2005 IEEE/RSJ International Conference on Intelligent Robots and Systems. INSPEC Accession No. 8750287, pp. 1078-1083 )Aug. 2-6, 2005).
Kilpela, Ari, et al. "Precise pulsed time-of-flight laser range finder for industrial distance measurements," Review of Scientific Instruments 72:2197-202 (Apr. 2001).
Lahoud, Jean, et al. "2D-driven 3D object detection in RGB-D images," Proceedings of the IEEE International Conference on Computer Vision, pp. 4622-4630 (2017).
Liu, Wei, et al. "SSD: Single shot multibox detector," European conference on computer vision, Springer, Cham., pp. 21-37 (2016).
Maturana, Daniel, et al. "Voxnet: A 3D convolutional neural network for real-time object recognition," 2015 IEEE/RSJ International Conference on Intelligent Robots and Systems (IROS), pp. 922-928 (Sep. 2015).
Mogg, Trevor "Domino's has built a self-driving pizza delivery robot," https://www.digitaltrends.com/cool-tech/dominos-pizza-delivery-robot, 12 pages (Mar. 18, 2016).
Mousavian, Arsalan, et al. "3D bounding box estimation using deep learning and geometry," Proceedings of the IEEE Conference on Computer Vision and Pattern Recognition (CVPR), pp. 7074-7082 (2017).
Navarro, Andre, et al. "A mobile robot vending machine for beaches based on consumers' preferences and multivariate methods," Procedia—Social and Behavioral Sciences 175:122-9 (2015).
Olson, Parmy "Self-Driving Robots Will Start Delivering Food For Just Eat and Others," https://www.forbes.com/sites/parmyolson/2016/07/05/self-driving-robots-food-delivery-just-eat/#60c56ca0280d, 3 pages (Jul. 5, 2016).
Peters, Adele "The Grocery Store of the Future is Mobile, Self-Driving, and Run by AI," https://www.fastcompany.com/40429419/this-tiny-grocery-store-is-mobile-self-driving-and-run-by-ai, 6 pages (Jun. 13, 2017).
Pettitt, Jeniece "Forget delivery drones, meet your new delivery robot," https://www.cnbc.com/2015/11/02/forget-delivery-drones-meet-your-new-delivery-robot.html, 5 pages (Nov. 2, 2015).
Qi, Charles, et al. "Frustum PointNets for 3D Object Detection from RGB-D Data," Proceedings of the IEEE Conference on Computer Vision and Pattern Recognition (CVPR), pp. 918-927 (Apr. 2018).
Qi, Charles, et al. "Frustum PointNets for 3D Object Detection from RGB-D Data, " Available from https://arxiv.org/abs/1711.08488v1, 15 pages (Nov. 22, 2017).
Qi, Charles, et al. "Pointnet: Deep learning on point sets for 3D classification and segmentation," Proceedings of the IEEE Conference on Computer Vision and Pattern Recognition (CVPR), pp. 652-660 (2017).
Qi, Charles, et al. "Pointnet++: Deep hierarchical feature learning on point sets in a metric space," Advances in Neural Information Processing Systems, 14 pages (2017).
Qi, Charles, et al. "Volumetric and multi-view CNNs for object classification on 3D data," Proceedings of the IEEE Conference on Computer Vision and Pattern Recognition (CVPR), pp. 5648-5656 (2016).
Ratkov, Anthony, et al. "Robotic Vending Machines," Anthonyratkkov.com/robotics/robotic vending machines, 2 pages (2010).

(56) References Cited

OTHER PUBLICATIONS

Ren, Jimmy, et al. "Accurate single stage detector using recurrent rolling convolution," Proceedings of the the IEEE Conference on Computer Vision and Pattern Recognition (CVPR), pp. 5420-5428 (2017).

Ren, Shaoqing, et al. "Faster R-CNN: Towards real-time object detection with region proposal networks," Advances in heural information processing systems, pp. 91-99 (2015).

Ren, Zhile, et al. "Three-dimensional object detection and layout prediction using clouds of oriented gradients," Proceedings of the IEEE Conference on Computer Vision and Pattern Recognition, pp. 1525-1533 (2016).

Richmond, Richard, et al. "Polarimetric Imaging Laser Radar (PILAR)," Program Air Force Research Lab, Advanced Sensory Payloads for UAV. Meeting Proceedings RTO-MP-SET-092, Paper 19. Neuilly-sur-seine, France: RTO, pp. 19-1 to 19-14 (May 1, 2005).

Riegler, Gernot, et al. "Octnet: Learning deep 3D representations at high resolutions, " Proceedings on the IEEE Conference on Computer Vision and Pattern Recognition (CVPR), pp. 3577-3586 (2017).

Skolnik, Merrill, et al. In: Introduction to Radar Systems Handbook, McGraw-Hill Book Company, 2nd Ed., 590 pages (1980).

Skolnik, Merrill, et al. In: Radar Handbook, McGraw-Hill Book Company, 2nd Ed., (1.18, 20.6 & 20.7-8), 846 pages (1990).

Song, Shuran, et al. "Deep sliding shapes for amodal 3D object detection in RGB-D images," Proceedings of the IEEE Conference on Computer Vision and Pattern Recognition, pp. 808-816 (2016).

Song, Shuran, et al. "Sliding shapes for 3D object detection in depth images," European Conference on Computer Vision, Springer, Cham., pp. 634-651 (2014).

Song, Shuran, et al. "Sun RGB-D: A RGB-D scene understanding benchmark suite," Proceedings of the IEEE Conference on Computer Vision and Pattern Recognition, pp. 567-576 (2015).

Su, Hang, et al. "Multi-view convolutional neural networks for 3D shape recognition," Proceedings of the IEEE Conference on Computer Vision and Pattern Recognition, pp. 945-953 (2015).

Wang, Peng-Shuai, et al. "O-CNN: Octree-based convolutional neural networks for 3D shape analysis," ACM Transactions on Graphics (TOG) 36(4):1-11 (2017).

Westaway, Luke "Meet the robot built to deliver your shopping. Starship Technologies' "local delivery robot" is semi-autonomous, covered in cameras and ready to bring food to your door," https://www.cnet.com/news/meet-the-robot-thats-built-to-deliver-your-shopping/, 4 pages (Feb. 24, 2016).

Wu, Zhirong et al. "3D shapenets: A deep representation for volumetric shapes," Proceedings of the IEEE Conference on Computer Vision and Pattern Recognition, pp. 1912-1920 (2015).

Xiang, Yu et al. "Data-driven 3D voxel patterns for object category recognition," Proceedings of the IEEE Conference on Computer Vision and Pattern Recognition, pp. 1903-1911 (2015).

Yu, Shang-Lin et al. "Vehicle detection and localization on bird's eye view elevation images using convolutional neural network," 2017 IEEE International Symposium on Safety, Security and Rescue Robotics (SSRR), INSPEC Accession No. 17315970 (2017).

\* cited by examiner

METHODS AND APPARATUS FOR SUPPORTING COMPARTMENT INSERTS IN AUTONOMOUS DELIVERY VEHICLES

CROSS REFERENCE TO RELATED APPLICATION

The patent application claims priority to U.S. Provisional Patent Application No. 62/907,875, entitled "Compartment Inserts for Autonomous Delivery Vehicles," filed Sep. 30, 2019, wherein is incorporated herein by reference in its entirety.

TECHNICAL FIELD

The disclosure relates to generally to autonomous vehicles. More particularly, the disclosure relates to providing autonomous vehicles with the capability to efficiently deliver a variety of different goods.

BACKGROUND

As the use of autonomous vehicles increases, the use of autonomous vehicles for different purposes is also increasing. One example of a growing use for autonomous vehicles is the use of autonomous vehicles to provide delivery services. The use of autonomous vehicles to deliver goods to customers may improve the quality of life of the customers, as customers may engage in productive work, entertainment, and/or rest while awaiting the delivery of goods, rather than spend time running errands to procure the goods.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
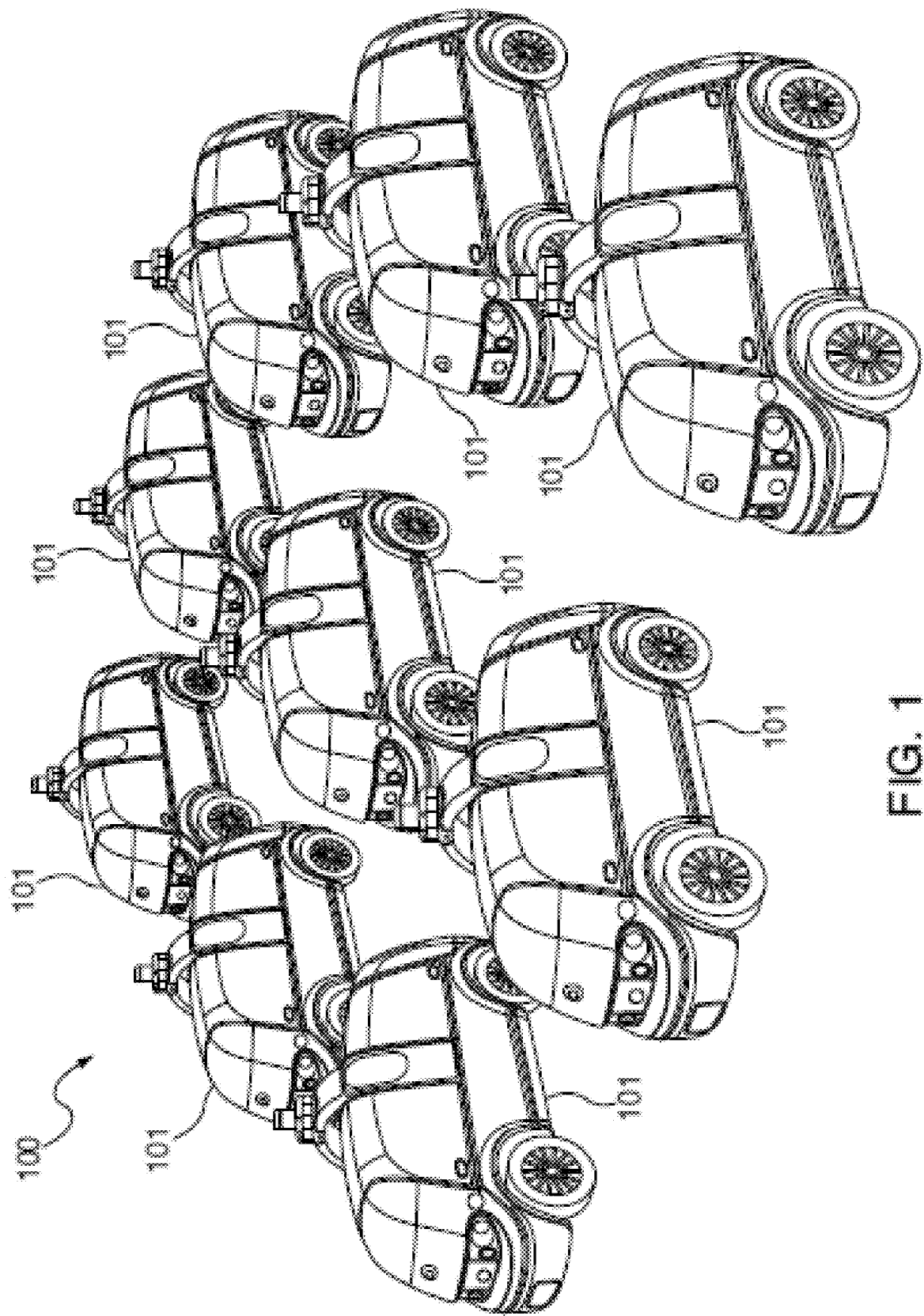
FIG. 1 is a diagrammatic representation of an autonomous vehicle fleet in accordance with an embodiment.

In one embodiment, an autonomous vehicle includes at least one compartment or cargo space. The at least one compartment is configured such that at least one compartment insert may be received within the at least one compartment. A compartment insert is arranged to be readily inserted into, and removed from, a compartment such that the set of capabilities possessed by the autonomous vehicle may be substantially customized. Compartment inserts may vary widely in terms of shapes, sizes, and capabilities.

In another embodiment, a method includes obtaining an order from a customer, the order including at least a first item and a second item, and causing the order to be loaded into a vehicle suitable for delivering the order to the customer, the vehicle including a first compartment and a second compartment, the first compartment being arranged to contain a first compartment insert that includes at least a first sub-compartment and at least a second sub-compartment, the second compartment being arranged to contain a second compartment insert that includes at least a third sub-compartment and a fourth sub-compartment, wherein loading the order into the vehicle includes loading the first item into the first sub-compartment and loading the second item into the third sub-compartment. The method also includes associating the first sub-compartment and the third sub-compartment with the order, and controlling the first sub-compartment and the third sub-compartment using a compartment control system, the compartment control system being associated the vehicle, wherein controlling the first sub-compartment and the third sub-compartment includes at least latching the first sub-compartment and the third sub-compartment to secure the order.

In still another embodiment, a method includes detecting, through a detection interface of a vehicle, an installation of a first compartment insert in a first compartment of the vehicle, wherein detecting the installation includes determining when the detection interface is in contact with a second interface of the first compartment insert. After detecting the installation of the first compartment insert, it is determined whether the first compartment insert is capable of transmitting information to the vehicle. The method also includes obtaining the information from the first compartment insert when it is determined that the first compartment insert is capable of transmitting the information to the vehicle, and identifying a type associated with the first compartment insert from the information.

In yet another embodiment, an apparatus includes a body and an interface arrangement. The body has an exterior surface. The interface arrangement includes at least one coupling arranged to enable the apparatus to be installed in a compartment of a vehicle, and is supported on the exterior surface. The at least one coupling includes an installation detection coupling arranged to indicate when the apparatus is installed in the compartment.

DESCRIPTION

Autonomous vehicles may be used to transport wide variety of goods or articles between patties. For example, autonomous delivery vehicles may be used to deliver goods from a retailer to an end consumer or a customer. While some goods do not have specific transport requirements, other goods may have specific transport requirements. By way of example, some goods may need to be maintained within specific temperature ranges to ensure that the goods to reach a destination in a satisfactory state. Other goods may need to be securely held within a compartment to protect against damage such as breakage, e.g., breakage of fragile items; and wrinkling, e.g., wrinkling of clothing which has been dry-cleaned.

Compartment inserts, or modular inserts, that are arranged to be secured or otherwise contained within a compartment of an autonomous vehicle allow for the autonomous vehicle to effectively be specifically configured for a desired purpose. Compartment inserts may be devices that are added to and/or removed from an autonomous vehicle in order to essentially customize a set of capabilities possessed by that vehicle at a specific time. The compartment inserts typically interface with a designed insert interface system on the vehicle which allows for interoperability between multiple types of compartment inserts. The compartment inserts may substantially comply with a modular design template, e.g., an insert platform." Compartment inserts may include inserts in a range of shapes and sizes such that one or multiple inserts may be inserted into a single compartment of an autonomous vehicle. In one embodiment, compartment inserts may be independently locked to secure contents contained therein, may draw power from an autonomous vehicle, and may be communicably connected to computers onboard the vehicle in order to be operated and/or controlled remotely.

Autonomous vehicles which provide delivery services may generally be included in a fleet of vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
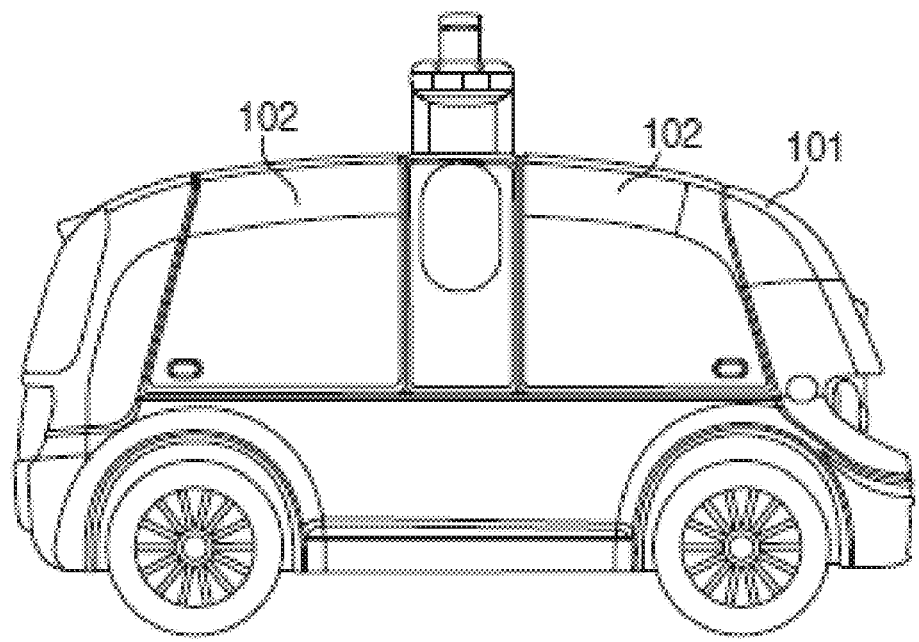
FIG. 2 is a diagrammatic representation of a side of an autonomous vehicle in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102, or cargo spaces, may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

In one embodiment, each compartment 102 may be configured to receive one or more compartment inserts (not shown in FIG. 2). Compartment inserts, which will be described in more detail below, are arranged to be inserted into compartments 102 to effectively customize the capabilities provided by autonomous vehicle 101. For example, if autonomous vehicle 101 is used as part of a pizza delivery service, compartment inserts may be warming trays or ovens arranged to keep pizzas warn during delivery. Or, also by way of example, if autonomous vehicle 101 is used as part of a dry-cleaning delivery service, compartment inserts may include a rod on which dry cleaned clothing items on hangers may be hung.

By positioning compartment inserts within compartments of an autonomous vehicle, the autonomous vehicle may relatively efficiently be configured to transport and/or to deliver a particular type of good. That is, the use of various types of compartment inserts which may be inserted into a compartment of a single autonomous vehicle allows the autonomous vehicle to be readily configured to deliver a wide variety of goods. The use of compartment inserts provides the flexibility to use an autonomous delivery vehicle for a variety of different purposes. Further, the use of compartment inserts allows the space within compartments of an autonomous vehicle to be efficiently utilized. By way of example, when deliveries of small items to multiple customers is required, the ability to provide as many compartment inserts designed to contain small items as may fit within a compartment of an autonomous vehicle allows substantially all of the available space within the compartment to be used. As a result, delivery bandwidth of an autonomous vehicle may be substantially maximized. In other words, batching of deliveries enables each autonomous vehicle to carry multiple orders substantially simultaneously.

In one embodiment, each compartment insert may be arranged to be individually securable such that a delivery order placed in a compartment insert for a first customer may not be accessed by anyone other than the first customer. Thus, when deliveries are batched, an autonomous vehicle is able to securely make the deliveries.

Figure 3:
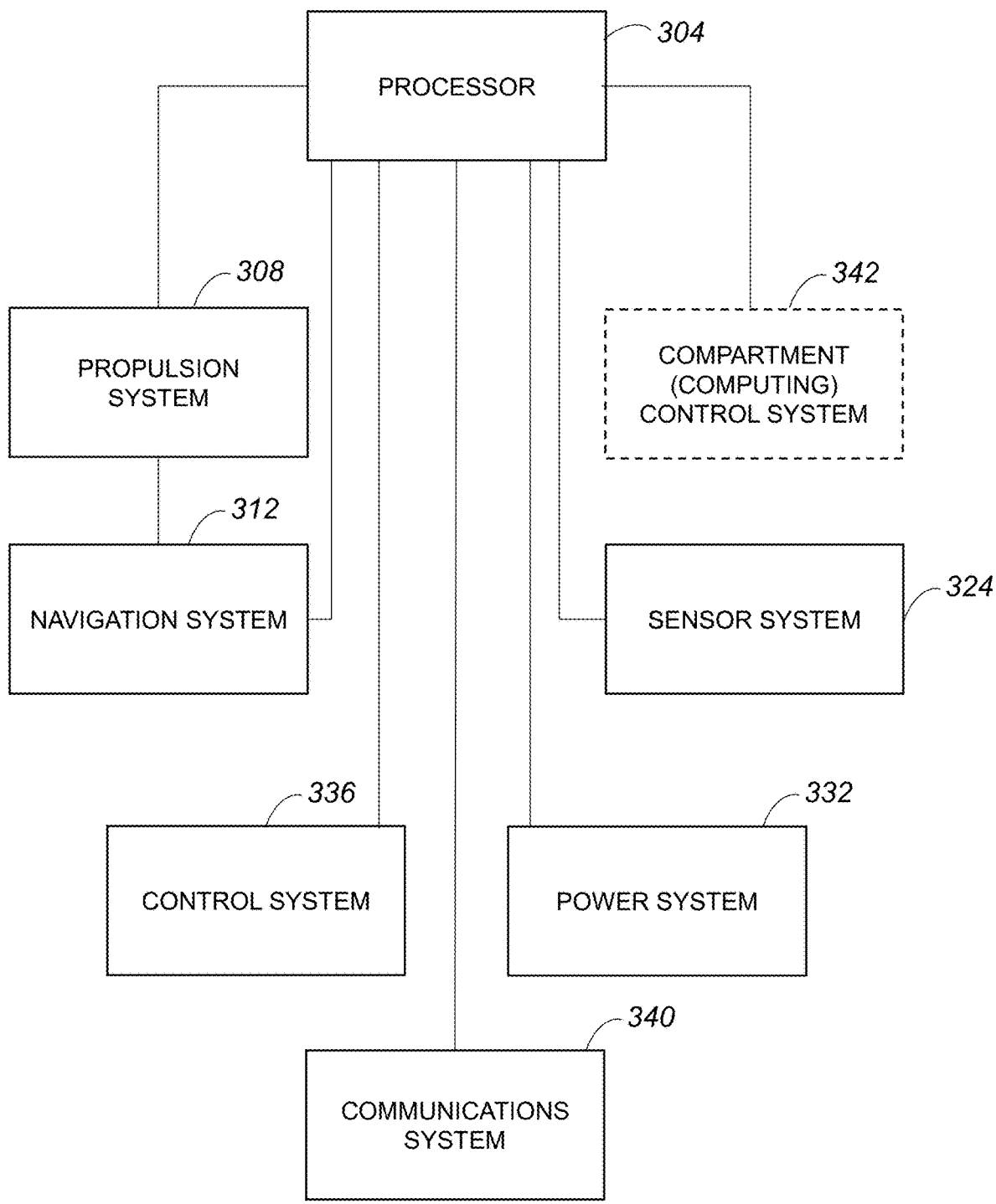
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101. In one embodiment, vehicle 101 may include an optional compartment control system 342.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not include sufficient power. It should be appreciated that power system 332 is arranged to provide power to compartments, e.g., compartments 102 of FIG. 2, or cargo bays such that compartment inserts within the compartments may be powered.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

Optional compartment control system 342 may be arranged to communicate with compartments 102 of autonomous vehicle 101, and/or with compartment inserts contained substantially within compartments 102. Such communications may be wireless and or wired communications, e.g., Ethernet communications. Compartment control system 342 may enable compartments 102 and/or compartment inserts to be configured, as for example by causing temperatures within compartments 102 and/or compartment inserts to be set. In one embodiment, compartment control system 342 may control access to, e.g., the opening and/or closing of doors on, compartments 102 and/or compartment inserts, Through compartment control system 342, compartments 102 and/or compartment inserts may provide information relating to the compartment inserts. The information provided by compartments 102 and/or compartment inserts may include, but is not limited to including, a type of a compartment insert, a unique identifier (ID) associated with the compartment insert, a condition of the compartment insert, and/or conditions within the compartment insert.

Figure 4:
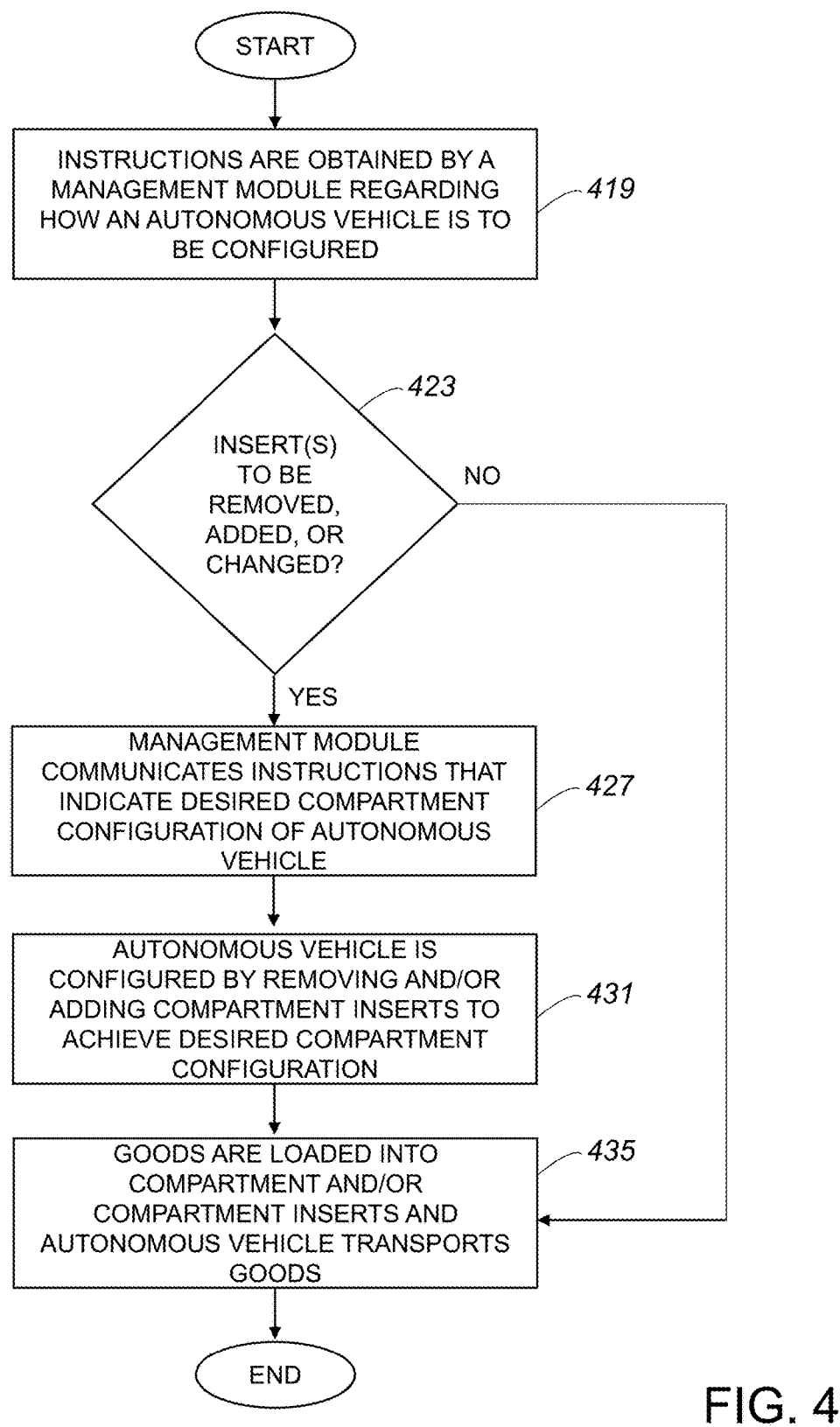
FIG. 4 is a process flow diagram which illustrates the steps associated with a method of configuring an autonomous vehicle to deliver goods in accordance with an embodiment.

Compartment inserts may be swapped into and out of compartments of autonomous vehicles, in one embodiment, in response to requests from parties that intend to utilize the autonomous vehicles to transport goods. In other words, an autonomous vehicle may be configured based upon the goods that the autonomous vehicle is to transport. Referring next to FIG. 4, the steps associated with a method of configuring an autonomous vehicle to deliver goods in accordance with an embodiment. A method 415 begins at a step 419 in which instructions are obtained regarding how an autonomous vehicle is to be configured. Instructions may be obtained, in one embodiment, by a management module of a fleet management system arranged to manage the autonomous vehicle and other autonomous vehicles. The management module is generally arranged to coordinate the deployment of autonomous vehicles, to assign tasks to the autonomous vehicles, and to monitor the location of each of the autonomous vehicles. The instructions regarding how the autonomous vehicle is to be configured may be associated with an indication of what type of goods the autonomous vehicle is to transport. In one embodiment, the instructions may be received from a retailer that has goods to transport.

From step 419, process flow proceeds to a step 423 in which it is determined whether compartment inserts, if any, that are currently in the autonomous vehicle are to be removed, added, or changed based on the instructions. If the determination in step 423 is that compartment inserts are not to be removed, added, or changed, the implication is that the current configuration of the autonomous vehicle is suitable to accommodate the goods the autonomous vehicle is to transport. Accordingly, process flow moves from step 423 to a step 435 in which goods are located into the compartment of the autonomous vehicle and/or any compartment inserts situated in the compartment, and the autonomous vehicle transports the goods. The method of configuring the autonomous vehicle to transport goods is completed upon the transport of the goods.

Alternatively, if it is determined in step 423 that at least one compartment insert in a compartment of the autonomous vehicle is to be removed, added, or changed, the management module communicates instructions in step 427 which indicate the desired compartment configuration of the autonomous vehicle. The instructions may be communicated using any suitable medium, and to any suitable recipient. For example, instructions may be communicated from the management module to a computing device that allows for the removal and addition of compartments inserts to be automated. In one embodiment, the instructions may be communicated from the management module to a computing device that may be accessed by an individual responsible for coordinating the removal, addition, and changing of compartment modules.

In a step 431, the autonomous vehicle is configured in accordance with the instructions. The autonomous vehicle may be configured by removing and/or adding compartment inserts such that a desired compartment configuration is effectively achieved. Once the autonomous vehicle is configured with the desired compartment configurations, goods are loaded into the compartment and/or compartment inserts in step 435. The goods loaded into the compartment and/or compartment inserts are transported by the autonomous vehicle, and the method of configuring the autonomous vehicle to transport goods is completed.

Figure 5:
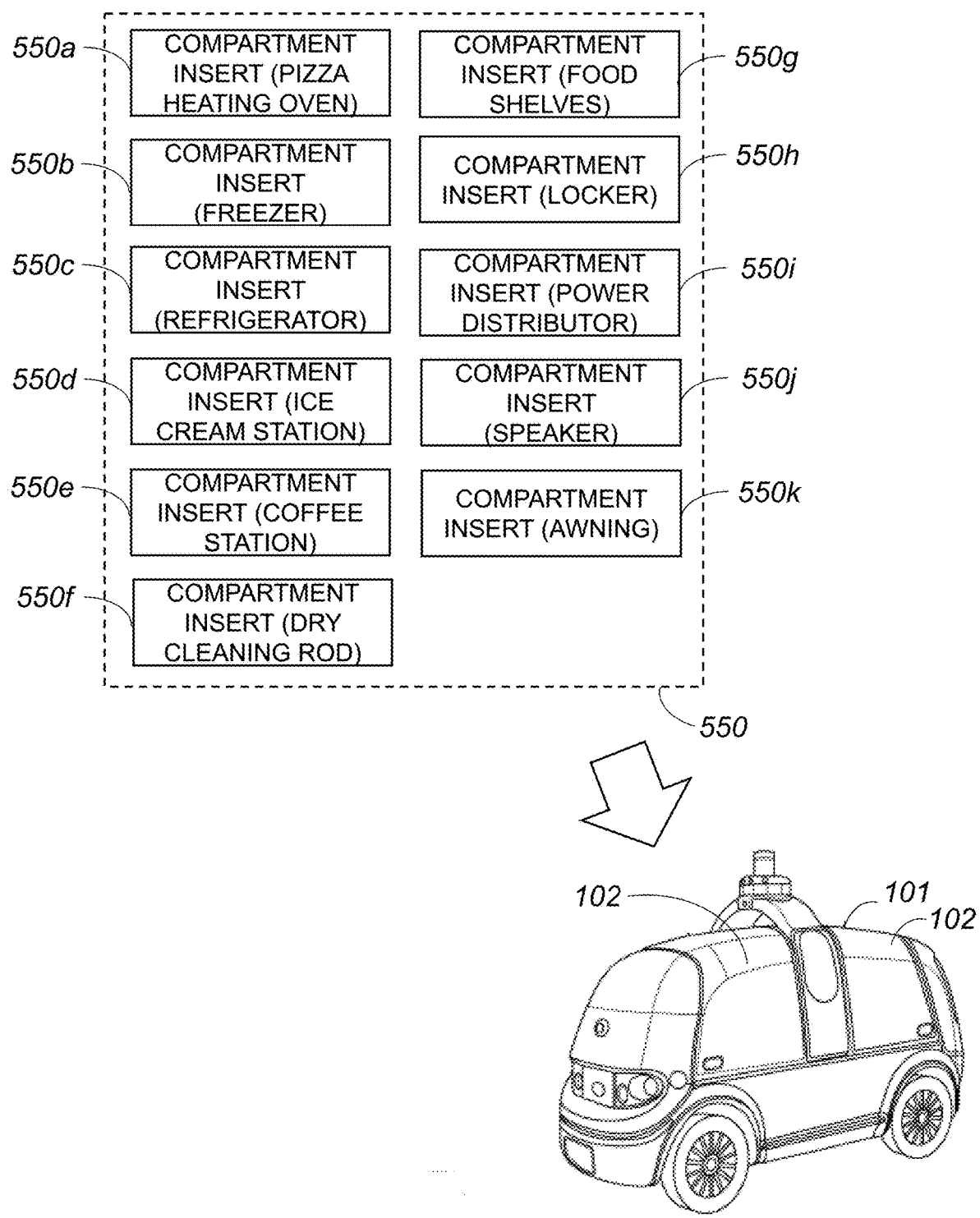
FIG. 5 is a block diagram representation of an overall system which includes an autonomous vehicle and a plurality of compartment inserts that may be placed in compartments of the autonomous vehicle in accordance with an embodiment.

As previously mentioned, compartment inserts which may be used to configure a compartment or a cargo space of an autonomous vehicle may vary widely. With reference to FIG. 5, examples of compartment inserts which may be installed or otherwise placed in a compartment of an autonomous delivery vehicle will be described in accordance with an embodiment. In general, autonomous vehicle 101 may include at least one compartment 102. As shown, autonomous vehicle 101 includes two compartments 102. It should be appreciated, however, that autonomous vehicle 101 may generally include fewer than or more than two compartments 102.

Each compartment 102 is arranged to accommodate one or more compartment inserts 550. Compartment inserts 550 which may be installed in compartments 102 may vary widely in size, shape, and functionality. In general, compartment inserts 550 include a mechanical or physical structure that is configured to contain items and/or to provide a service. Compartment inserts 550 may also be formed from any suitable material, e.g., a thermal insulating material. Compartment inserts 550 may be arranged to draw power from autonomous vehicle 102, e.g., from a power port (not shown) in compartment 102, and may include physical structures such as fasteners that are arranged to allow compartment inserts 550 to be coupled to features within compartment 102 for stability. For example, compartment inserts 550 may be configured to be temporarily mounted to a floor (not shown) of compartment 102. Fasteners, or other features, that allow compartment inserts 550 to effectively be coupled to corresponding features in compartments 102 may include fasteners that enable compartment inserts 550 to be removably coupled to compartments 102 such that compartments inserts 550 may be securely held within compartments 102, while being relatively easy to remove from and insert in compartment 102. The disposition of such fasteners and features enhances the modularity of compartment inserts 550 by allowing compartments inserts 550 to be relatively quick to swap in and out of compartments 102. In one embodiment, compartments 102 may include tracks or guides that features on compartment inserts 550 may slide in and out of such that what while compartment inserts 550 are positioned in compartments 102, such tracks or guides cooperate with the features on compartment inserts 550 to effectively hold compartment inserts 550 in place.

Each compartment insert 550 may have a body, and may include a securable, e.g., lockable, door that is arranged to be unlocked only by an individual, or for an individual, who is authorized to access the contents of compartment insert 550. It should be appreciated that contents of compartment insert 550 may be contained in an interior space of compartment insert 550, e.g., a space that is defined by or within the body. Such a lockable door may be transparent, or may include a transparent feature, which allows contents of compartment insert 550 to be viewed. In some embodiments, two or more compartment inserts 550 may be arranged to be coupled to each other for additional stability. It should be appreciated that each compartment insert 550 may be substantially divided into one or more sections, each of which may include a separate securable door or covering.

Compartment inserts 550 may include a compartment insert 550*a* that is a pizza heating oven that is arranged to keep a pizza contained within compartment insert 550*a* warm while the pizza is transported by autonomous vehicle 101, Compartment insert 550*a* may include at least one heating element, e.g., a heating coil, that allows a pizza within compartment insert 550*a* to be kept warm. Compartment insert 550*a* may, have a body that includes walls which define a space within the body that is heated by at least one heating element. The heating element is provided within compartment insert 550*a*, and may be powered using power provided by autonomous vehicle 101. Compartment insert 550*a* may also include a rack or a shelf on which a pizza, e.g., a pizza packaged within a pizza delivery box, may be placed. In one embodiment, compartment insert 550*a* may include a red color marking and/or a warning label that provides an indication that the contents of compartment insert 550*a* are hot.

Some compartments inserts 550 may provide cooling capabilities. For example, a compartment insert 550*b* may be a freezer insert and a compartment insert 550*c* may be a refrigerator insert, Compartment insert 550*b* may be maintained at a temperature which is sufficient to allow contents to remain in a frozen state, while compartment insert 550*c* may be maintained at a temperature which is sufficient to allow contents to remain cool. Compartment inserts 550*b*, 550*c* may includes compressors, pipes, and refrigerant gases that are provided with power from autonomous vehicle 101. In one embodiment, compartment insert 550*b* and compartment insert 550*c* may include blue color markings and/or warning labels that provide indications that the contents of compartment insert 550*b* are frozen and that the contents of compartment 550*c* are cool or cold.

Compartment inserts 5:50 may be specialized and configured to provide the experience of being at a store or a kiosk. For example, a compartment insert 550*d* may be an ice cream station and a compartment insert 550*e* may be a coffee station. Compartment insert 550*d* may include freezer capabilities such that ice cream or other frozen desserts may be kept frozen. Compartment insert 550*d* may include an ice cream dispenser and other features, e.g., a toppings tray or an ice cream cone dispenser, such that autonomous vehicle may have substantially the same functionality as an ice cream truck. Compartment 550*e* may include a coffee maker, a water reservoir arranged to supply water to the coffee maker, and other features, e.g., a cup dispenser and a milk dispenser, which effectively enable compartment 550*e* to serve as a coffee station.

Compartment inserts 550 may include a compartment insert 550*f* that supports a dry-cleaning delivery service, e.g., by providing a rod which extends substantially horizontally between side walls of compartment insert 550*f*. Compartment insert 550*f* may include a rod on which dry cleaned clothing, which is typically presented on a hanger, may be hung.

In one embodiment, compartment inserts 550 may include a compartment insert 550*g* which is configured with shelves on which items may be stored and/or displayed. For example, compartment insert 550*g* may includes shelves such that grab-and-go sandwiches may be displayed on the shelves. Compartment insert 550*g* may be arranged to provide cooling capabilities such that displayed items may remain cooled during transport. Alternatively, compartment insert 550*g* may be arranged to provide heating capabilities such that displayed items may remain heated during transport.

Compartment inserts 550 may also generally include a compartment insert 550*f* which serves as a locker. Compartment insert 550*h* may be configured as a substantially empty box, or may be configured to include shelves, hooks, pouches, and/or other mechanisms arranged to support goods within compartment insert 550*h*. As is the case for other compartment inserts 550, compartment insert 550*h* may be lockable. In one embodiment, compartment insert 550*h* may include multiple lockers that may be individually locked, e.g., compartment insert 550*h* may include two or more sub-compartments which may be substantially independently locked and/or controlled.

Some compartment inserts 550 may be arranged to facilitate the use of other compartment inserts 550. For example, a compartment insert 550*i* may be a power distributor. In one embodiment, compartment insert 550*i* may be arranged to obtain power from autonomous vehicle 101, and may include power ports that other compartment inserts 550 may plug into, e.g., when compartment 102 does not include enough power ports to support compartment inserts 550 contained within compartment 102. Compartment insert 550*i* may instead, in some instances, include power ports that are powered by a battery included in compartment insert 550*i*.

Compartment inserts 550 may also include a compartment insert 550*j* that includes a speaker. Compartment insert 550*j* may be arranged to broadcast information or entertainment, for example, to customers or other individuals who are located in an environment around autonomous vehicle 101. For instance, compartment insert 550*j* may broadcast an alert that autonomous vehicle is arriving at a location, or may broadcast an alert that autonomous vehicle is about to depart a current location.

In the described embodiment, compartment inserts 550 may include a compartment insert 550*k* that is configured to provide protection from weather conditions. For example, compartment insert 550*k* may be arranged to enable an awning or an umbrella to be deployed such that a user of vehicle 101 may be protected from rain by the awning or the umbrella. Compartment insert 550*k* may generally include a covering and a deployment mechanism. The covering may be configured to shield a user and/or goods within compartments 102 upon deployment.

Figure 6:
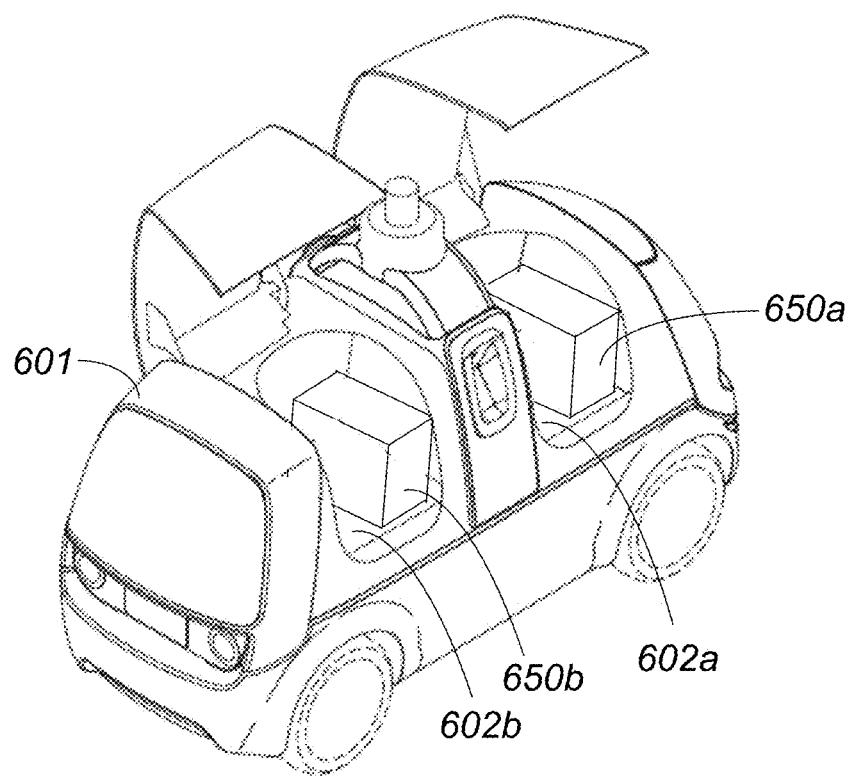
FIG. 6 is a diagrammatic representation of an autonomous vehicle with compartments in which compartment inserts, e.g., compartment inserts that do not occupy all available compartment space, are inserted in accordance with an embodiment.

Space within in compartments or cargo bays of an autonomous vehicle may be utilized such that compartment inserts occupy substantially only part of the space, or such that compartment inserts substantially fill the space. With reference to FIG. 6, the use of compartment inserts that occupy part of the space in a compartment of an autonomous vehicle will be described, and with reference to FIG. 7, the use of compartment inserts that fill substantially all of the space in a compartment of an autonomous vehicle will be described.

FIG. 6 is a diagrammatic representation of an autonomous vehicle with compartments in which compartment inserts, e.g., compartment inserts that do not occupy all available compartment space, are inserted in accordance with an embodiment. An autonomous vehicle 601 includes compartments 602*a*, 602*b*. Each compartment 602*a*, 602*b* may include at least one power port (not shown), and may include various other ports (not shown) which include, but are not limited to including, a data port such as an Ethernet port, an exhaust port, and/or a drainage port.

A first compartment 602*a* contains a first compartment insert 650*a*. In one embodiment, first compartment insert 650*a* may be an oven or other food warmer that is arranged to keep food items, e.g., pizza, warm during transport. First compartment insert 650*a* is arranged to occupy less than all of the space within first compartment 602*a*, and may be powered through a power port (not shown) in first compartment 602*a*. Space within first compartment 602*a* that is not occupied by first compartment insert 650*a* may remain substantially empty, or may be used to store delivery implements that enhance convenience for a customer. For example, space may be used to store bags that a customer may use to carry food items after the food items are retrieved from compartment insert 650*a*. Alternatively, space may be used to install another compartment insert (not shown) which may be of the same type as first compartment insert 650*a*, or may be different.

A second compartment 602*b* contains a second compartment insert 650*b*. Second compartment insert 650*b* may be, in one embodiment, a freezer that is arranged to keep food items frozen during transport. Second compartment insert 650*b* is arranged to occupy less than all of the space within second compartment 602*b*, and may be powered through a power port (not shown) in second compartment 602*b*. As shown, space within second compartment 602*b* that is not occupied by second compartment insert 650*b* may be used to store bags which may be used to carry food items after food items are retrieved from compartment insert 650*b*, or may be used to install another compartment insert (not shown).

In one embodiment, to increase thermal insulation between first compartment insert 650*a* and second compartment insert 650*b* are not located in the same compartment 602*a*, 602*b*. It should be appreciated, however, that in some embodiments, thermal characteristics of first compartment insert 650*a* and second compartment 650*b* may be such that positioning first compartment insert 650*a* and second compartment 650*b* in the same compartment 602*a*, 602*b* has no significant adverse effect on the warming capabilities of first compartment insert 650*a* and the freezing capabilities of second compartment insert 650*b*.

Figure 7:
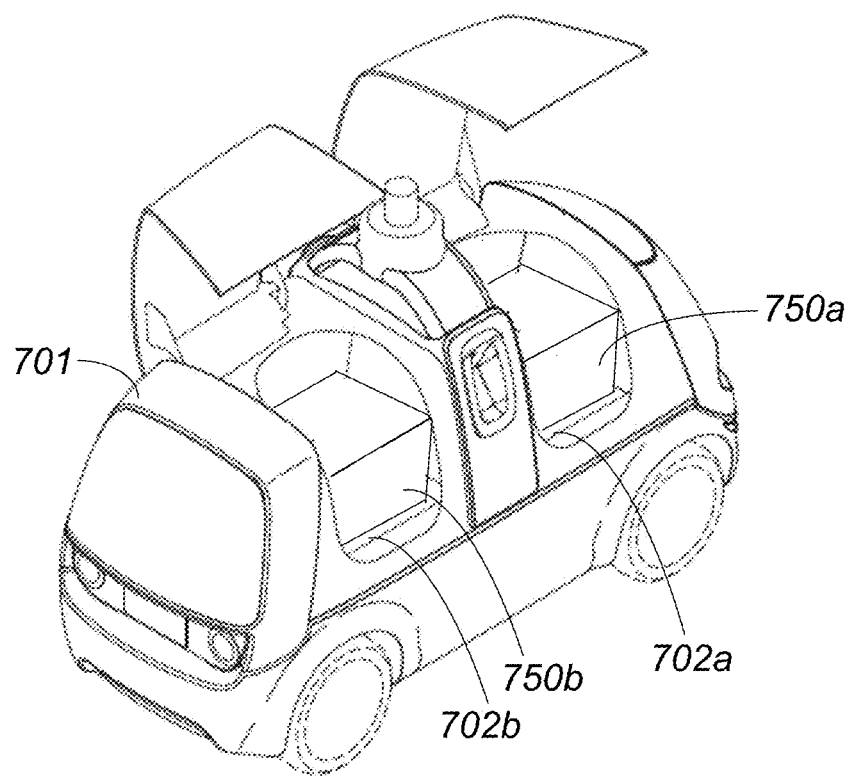
FIG. 7 is a diagrammatic representation of an autonomous vehicle with compartments in which compartment inserts, e.g., compartment inserts that occupy substantially all available compartment space, are inserted in accordance with an embodiment.

FIG. 7 is a diagrammatic representation of an autonomous vehicle with compartments in which compartment inserts, e.g., compartment inserts that occupy substantially all available compartment space, are inserted in accordance with an embodiment. An autonomous vehicle 701 includes a first compartment 702a and a second compartment 702b. First compartment 702a and second compartment 702b may include any number of ports (not shown), e.g., power ports, which are arranged to interface with at least a first compartment insert 750a held in first compartment 702a and at least a second compartment insert 750b held in second compartment 702b. For example, a power port (not shown) in first compartment 702a may provide power to first compartment insert 750a, and a power port (not shown) in second compartment 702b may provide power to second compartment insert 750b.

In one embodiment, first compartment insert 750a is an oven or other food warmer that is arranged to keep food items, e.g., pizza, warm during transport, while second compartment insert 750b is a freezer that is arranged to keep food items frozen during transport. First compartment insert 750a is arranged to occupy approximately all of the space within first compartment 702a. Second compartment insert 750b is arranged to occupy approximately all of the space within second compartment 702b.

While first compartment insert 750a has been shown as substantially filling all available space within first compartment 702a, it should be understood that in some embodiments, more than one compartment insert may be used to occupy substantially all available space in first compartment 702a. Similarly, while second compartment insert 750b has been shown as substantially filling all available space within second compartment 702b, more than one compartment insert may instead be used to fill substantially all available space in second compartment 702b.

When a customer or other user interacts with an autonomous vehicle, as for example during the course of delivery of a good or a service by the autonomous vehicle, information may effectively be exchanged between the customer and a compartment insert in the vehicle. Such a compartment insert may be "smart," or may otherwise have sensing, communications, and/or processing capabilities. In one embodiment, a smart compartment insert may include sensors, a communications interface, and a computing device. Typically, a smart compartment insert may include sensors and a computing device, and may exhibit complex and/or automatic behavior based on context. For example, a smart compartment insert may utilize sensors to detect a state associated with an environment or a state of the world, and react or otherwise respond to the detected state using the computing device. In other words, a smart compartment insert may react to sensor information. A smart compartment insert may receive data from a vehicle, e.g., via a compartment which houses the smart compartment insert, and react accordingly.

Figure 8A:
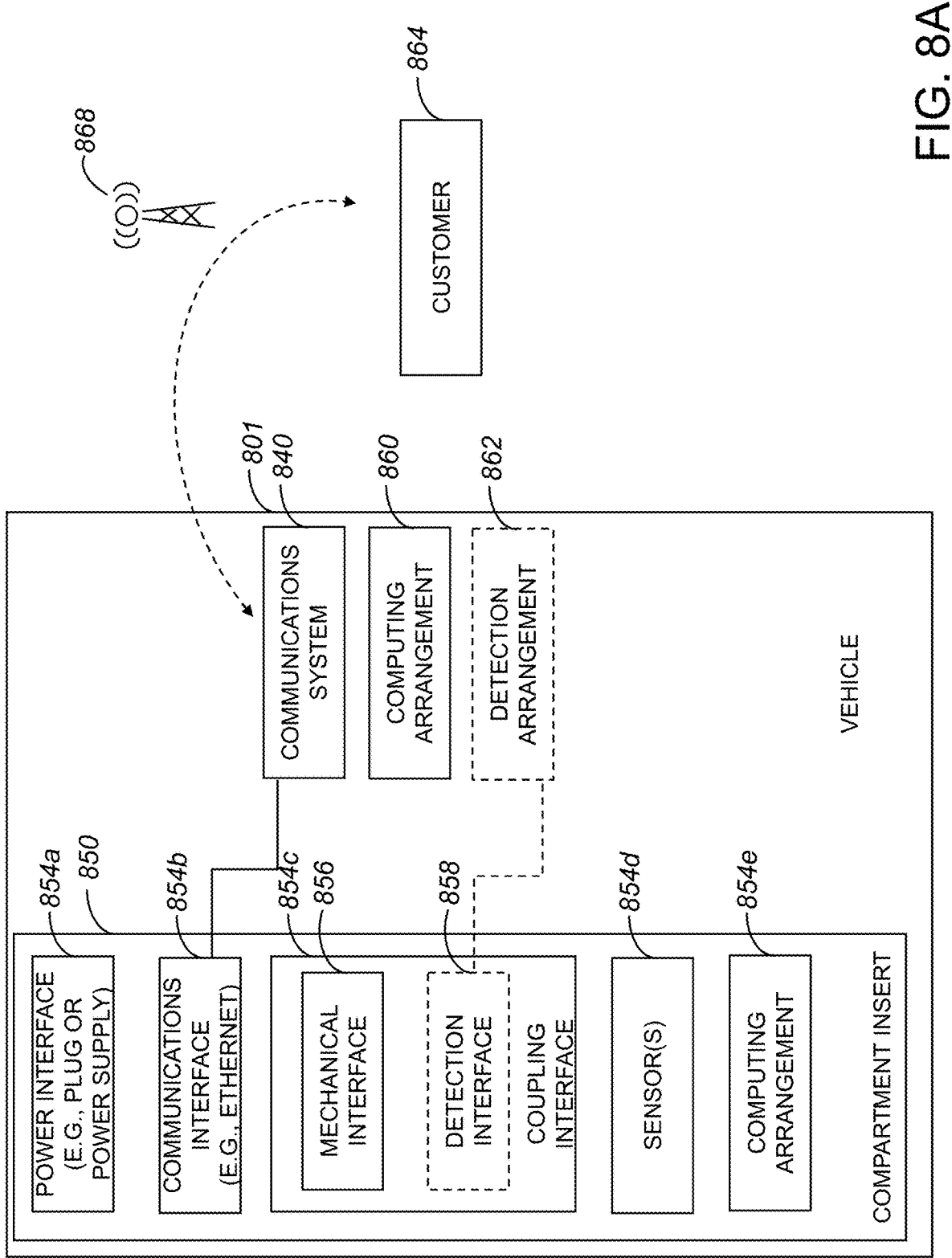
FIG. 8A is a block diagram representation of an overall system which enables a customer to exchange information with a compartment insert contained in a vehicle in accordance with a first embodiment.

When a customer effectively exchanges information with a compartment insert housed in a compartment of a vehicle, the customer may either communicate with the compartment insert via the vehicle, or the customer may communicate substantially directly with the compartment insert. FIG. 8A is a block diagram representation of an overall system which enables a customer to exchange information with a compartment insert contained in a vehicle in accordance with a first embodiment. A vehicle 801 includes a compartment insert 850 installed or otherwise contained thereon, as for example in a compartment (not shown) of vehicle 801.

In one embodiment compartment insert 850 is smart, and includes a power interface 854a, a communications interface 854b, a coupling or insert interface 854c, one or more sensors 854d, and a computing arrangement 854e. Power interface 854a may be arranged to draw power from vehicle 801, or may be a substantially separate power supply arranged to provide power to compartment insert 850. Communications interface 854b is configured to enable communications, as for example Ethernet communications, between compartment insert 850 and an overall communications system 840 of vehicle. Communications interface 854b may further be configured to support wireless communications.

Coupling interface 854c is configured to couple compartment insert 850 to vehicle 801 or, more specifically, to a compartment (not shown) of vehicle 801. Coupling interface 854c includes a mechanical interface 856 and an optional detection interface 858. Mechanical interface 856 is arranged to enable compartment insert 850 to be mechanically, e.g., structurally, coupled to vehicle 801, and optional detection interface 858 is configured to effectively interface with an optional detection arrangement 862 of vehicle 801. Optional detection interface 858 may be arranged to interface with optional detection arrangement 862 to signal to vehicle 801 that compartment insert 850 is installed. In one embodiment, optional detection interface 858 may include an electrical pin that is configured to interact or to otherwise interface with optional detection arrangement 862, which may include an electrical circuit that may be substantially activated when the electrical pin completes or otherwise closes the electrical circuit. Such an optional detection arrangement 862 may include an electrical connector that is configured to couple with optional detection interface 858 such that when contact is made between optional detection arrangement 862 and optional detection interface 858, an electrical circuit is substantially closed and the presence of compartment insert 850 in or on vehicle 801.

Sensors 854d may include sensors which enable conditions within compartment insert 850 to be controlled, e.g., temperature and/or humidity sensors. Sensors 854d may also include sensors which enable contents contained in compartment insert 850 to be monitored including, but not limited to including, barcode sensors, weight sensors, cameras, and/or microphones. Computing arrangement 854e may control and/or monitor sensors 854d, although sensors 854d may instead be controlled and/or monitored by computing arrangement 860 of vehicle 801.

When vehicle 801 is used to deliver items to a customer 864, customer 864 may communicate with vehicle over a network 868 and through communications system 840. Network 868 may generally be a wireless network such as, for example, a cellular network such as a 3G/4G/5G network, an LTE network, a Wi-Fi network, and/or a Bluetooth network.

Figure 8B:
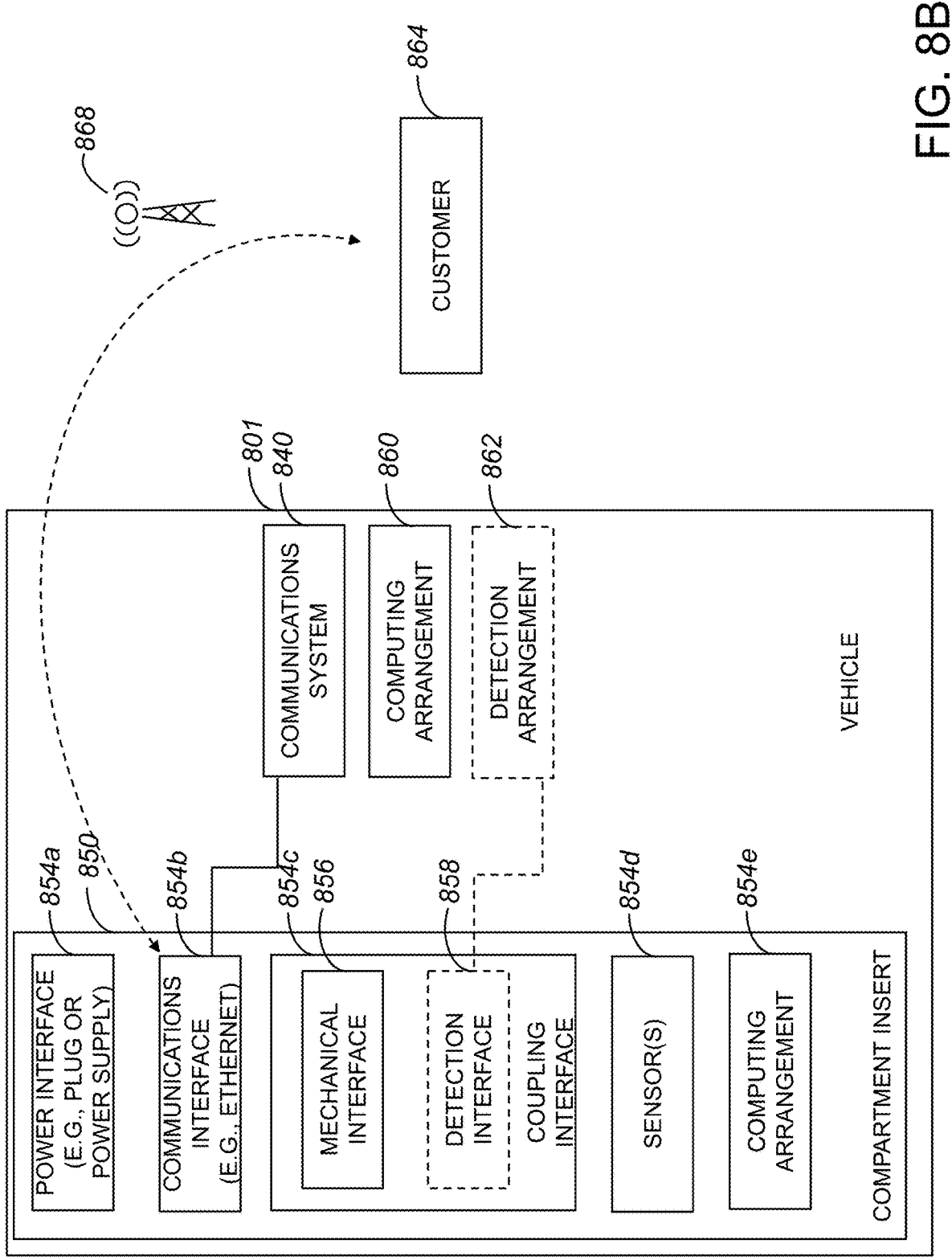
FIG. 8B is a block diagram representation of an overall system which enables a customer, e.g., customer 864 of FIG. 8A, to exchange information with a compartment insert contained in a vehicle, e.g., compartment insert 850 contained in vehicle 801 of FIG. 8A, in accordance with a second embodiment.

In one embodiment, customer 864 may communicate directly with compartment insert 850 rather than with communications system 840 of vehicle 801. As shown in FIG. 8B, customer 864 may communicate over network 868 substantially directly with communications interface 854b.

In one embodiment, a vehicle may effectively detect when a compartment insert is installed or otherwise positioned in a compartment of the vehicle. The compartment may include sensors, e.g., weight sensors or cameras, which may be used to determine when a compartment insert is installed in the compartment. The compartment may also include an electrical interface which is configured to sense when a pin, e.g., an electrical pin, on a compartment insert is in contact with the electrical interface. Once a vehicle detects that a compartment insert is installed, the vehicle may communicate with the compartment insert.

Figure 9:
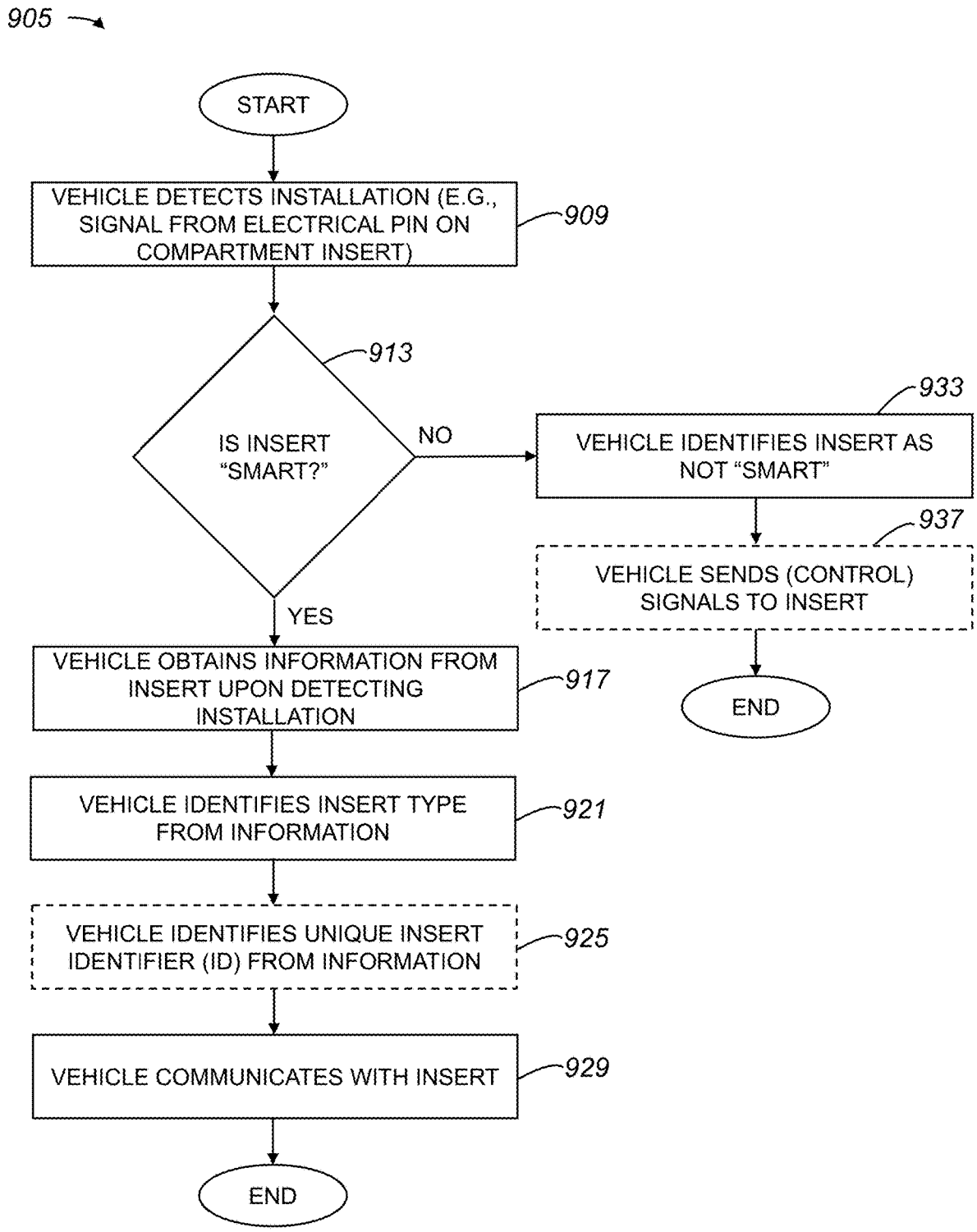
FIG. 9 is a process flow diagram which illustrates a method of initiating communications between a vehicle and a compartment insert contained in a compartment of the vehicle in accordance with an embodiment.

With reference to FIG. 9, a method of initiating communications between a vehicle and a compartment insert contained in a compartment of the vehicle in accordance with an embodiment. A method 905 of initiating communications between a vehicle and a compartment insert begins at a step 909 in which the vehicle detects that a compartment insert is installed in a compartment of the vehicle. Detecting the installation of a compartment insert may include, in one embodiment, the vehicle obtaining a signal from an electrical pin on the compartment insert.

A determination is made in a step 913 as to whether the compartment insert is smart, or otherwise able to communicate with the vehicle. That is, it is determined whether the vehicle may send and/or receive information from the compartment insert. If the determination in step 913 is that the insert is smart, then the vehicle obtains information from the insert in a step 917. The information may be obtained, in one embodiment, over a wired connection such as an Ethernet connection or over a wireless connection such as a cellular, Wi-Fi, or Bluetooth connection.

The vehicle identifies an insert type in a step 921 from the information provided by the compartment insert. The insert type may be encoded as one or more bits, and transmitted to the vehicle by the compartment insert. The insert type may include, but is not limited to including, an indication of the purpose served the insert, an indication of whether the insert may be locked or otherwise secured, and/or an indication of a size of the insert type. For example, an insert type may indicate that a compartment insert is an oven, that the oven may be locked, and that the oven may accommodate a particular number of pizzas.

From step 921, process flow proceeds to an optional step 925, the vehicle may identify a unique ID from the information. In the event that the compartment insert provides information that uniquely identifies the compartment insert, the unique ID may be used to track the actual compartment insert. For example, if there is an issue with the compartment insert, the unique ID may be used to readily identify the compartment insert such that a troubleshooting process may be undertaken.

In a step 929, the vehicle communicates with the compartment insert. Such communication may include, but is not limited to including, the vehicle sending control signals to the compartment insert to control at least one condition such as a temperature within the compartment insert, the vehicle sending control signals to lock and/or to unlock a door on the compartment insert, and/or the compartment insert sending status information to the vehicle. Upon the vehicle communicating with the compartment insert, the method of initiating communications between a vehicle and a compartment insert.

Returning to step 913 and the determination of whether the compartment insert is smart, if the determination is the compartment insert is not smart, the implication is that the compartment insert is unable to provide information to the vehicle. Accordingly, process flow moves from step 913 to a step 933 in which the vehicle identifies the compartment insert as not smart, or otherwise unable to send information to the vehicle. In an optional step 937, the vehicle may send control signals to the compartment insert. For example, while the compartment insert may not be smart, the compartment insert may include a device such as a heater that may be controlled by the vehicle. The method of initiating communications between a vehicle and a compartment insert is terminated either once the compartment insert is identified as not being smart and/or the vehicle sends control signals to the compartment insert.

Figure 10:
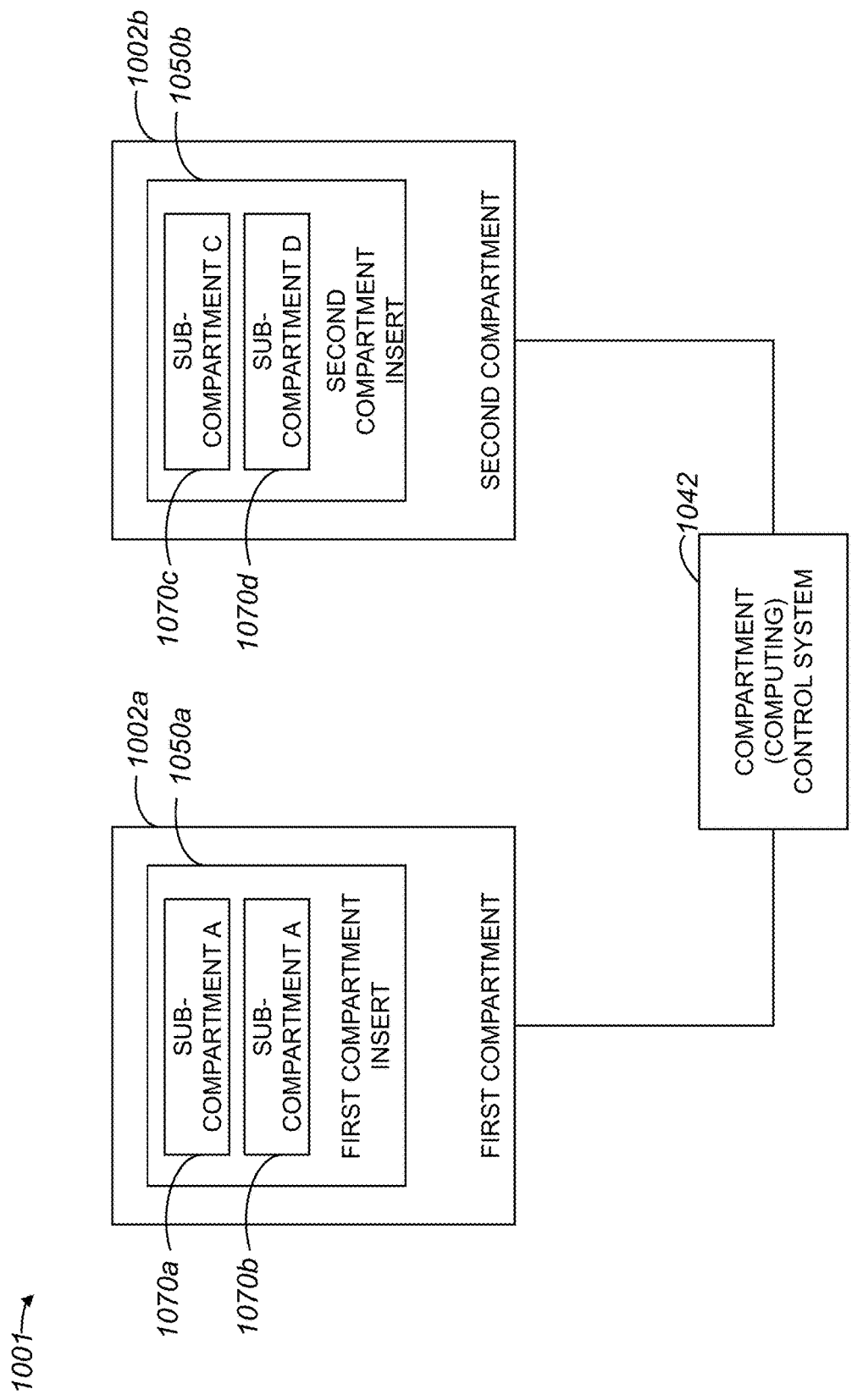
FIG. 10 is a block diagram representation of a vehicle that includes a compartment control system which is configured to control sub-compartments of compartment inserts in accordance with an embodiment.

Some compartment inserts may be arranged to include multiple sub-compartments. That is, a compartment insert may include mechanical structures that substantially divide an interior space of the compartment insert into separate sections. When a compartment insert includes multiple sub-compartments, items associated with different delivery orders may be substantially securely contained in the same compartment insert, thus leading to efficiency in an overall delivery process. FIG. 10 is a block diagram representation of a vehicle that includes a compartment control system which is configured to control sub-compartments of compartment inserts in accordance with an embodiment. A vehicle 1001, which may be an autonomous delivery vehicle, includes at least a first compartment 1002a and a second compartment 1002b. Compartments 1002a, 1002b are effectively built into vehicle 1001. Vehicle 1001 also includes a compartment control system 1042 which is arranged to substantially control compartments 1002a, 1002b, and/or compartment inserts 1050b, 1050b. In one embodiment, compartment control system 1042 may be arranged to communicate directly with compartment inserts 1040a, 1050b.

First compartment insert 1050a, which is installed in first compartment 1002a, includes at least a sub-compartment A 1070a and a sub-compartment B 1070b. Second compartment insert 1050b, which is installed in second compartment 1002b, includes at least a sub-compartment C 1070c and a sub-compartment D 1070d. Sub-compartments 1070a-d may be arranged to be individually controlled, e.g., by compartment control system 1042, such that conditions in each sub-compartment 1070a-d may be different and such that each sub-compartment 1070a-d may be individually locked and unlocked.

Sub-compartments 1070a, 1070b may be substantially the same, and sub-compartments 1070c, 1070d maybe substantially the same. It should be appreciated, however, that sub-compartments 1070a, 1070b of compartment 1050a may be different and sub-compartments 1070c, 1070d of compartment 1050b may be different. For example, the dimensions and, hence, sizes of sub-compartments 1070a, 1707b may differ. The temperatures or conditions within sub-compartments 1070a, 1070b, as well as physical characteristics or configurations within sub-compartments 1070a, 1070b may also vary.

In one embodiment, each sub-compartment 1070a-d may effectively be a locker that may be individually latched and unlatched, e.g., locked and unlocked. In another embodiment, through compartment control system 1042, two or more sub-compartments 1070a-d may be controlled substantially together. For example, as will be discussed below with respect to FIGS. 10 and 11, items associated with a single order may be placed in different sub-compartments 1070a-d, and compartment control system 1042 may be arranged to latch, and/or to unlatch, the different sub-compartments 1070a-d at substantially the same time. Doors or covers that enable access to sub-compartments 1070a-d to be controlled may include latches or other locking devices which may be controlled by compartment control system 1042 to enable and/or to disable access to sub-compartments 1070a-d.

When customers place orders for delivery by an autonomous delivery vehicle, the orders may include multiple items. Some of the items in an order may benefit from different environments. For example, a multi-item order placed by a customer may include an item such as ice cream which is to be maintained at a cold temperature, and an item such as pizza which is to be maintained at a hot temperature.

As such, a multi-item order may benefit from ice cream being placed in a sub-compartment of a freezer insert and pizza being placed in a sub-compartment of an oven insert.

Figure 11:
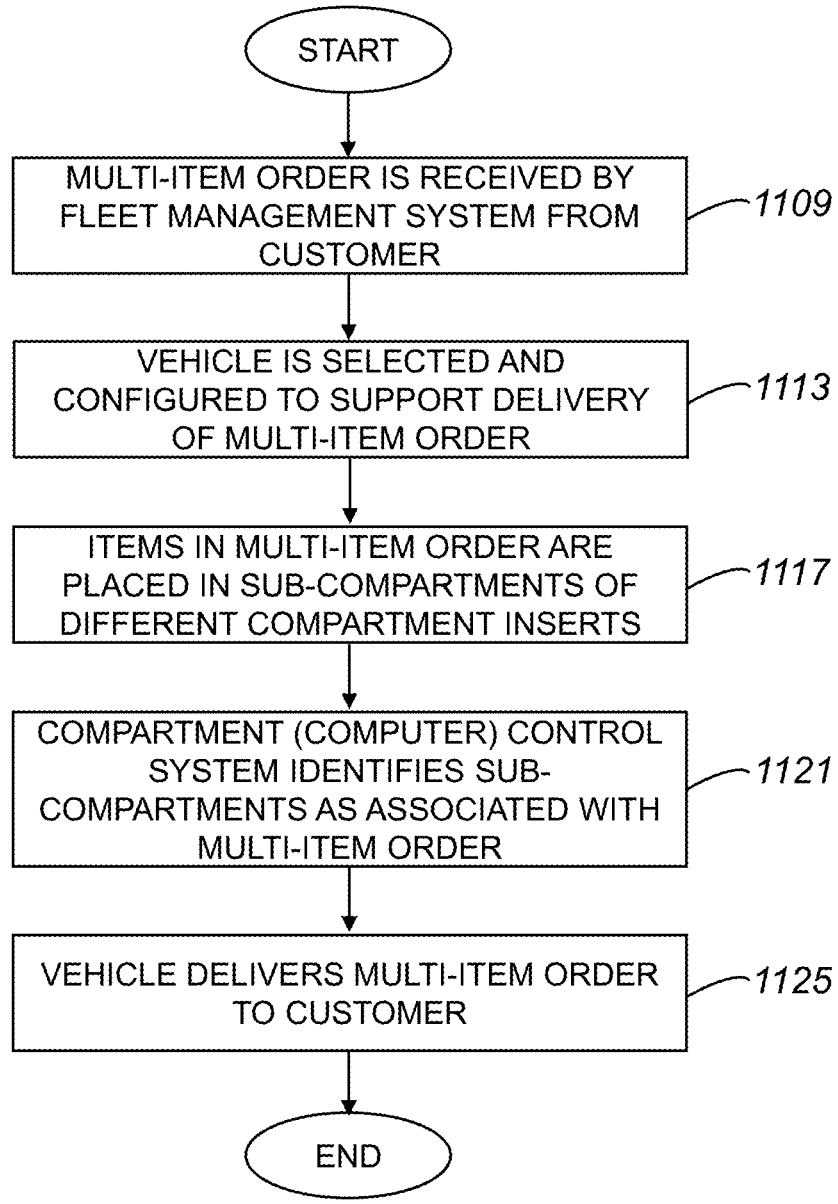
FIG. 11 is a process flow diagram which illustrates a method of preparing a vehicle to deliver a multi-item order divided between compartments of the vehicle in accordance with an embodiment.

FIG. 11 is a process flow diagram which illustrates a method of preparing a vehicle to deliver a multi-item order divided between compartments of the vehicle in accordance with an embodiment. A method 1105 of preparing a vehicle to deliver a multi-item order begins at a step 1109 in which a multi-item order is received, as for example by a fleet management system, from a customer. The multi-item order may generally include more than one item and, in the described embodiment, may include items that would benefit from different storage environments.

In a step 1113, a vehicle is selected, as for example by the fleet management system, and configured to support the delivery of the multi-item order. Selecting a vehicle may include, but is not limited to including, selecting a vehicle of a proper size to accommodate the multi-item delivery, selecting a vehicle in relatively close proximity to a delivery address of the customer, selecting a vehicle that is scheduled for use in relatively close proximity to the delivery address, and/or selecting a vehicle which has sufficient power to complete the delivery. Configuring a vehicle may include, but is not limited to including, determining which compartment inserts to install in the vehicle, installing compartment inserts in the vehicle, and/or substantially ensuring that compartments and corresponding sub-compartments are functioning.

From step 1113, process flow proceeds to a step 1117 in which items in the multi-item order are placed in sub-compartments of different compartment inserts. The different compartment inserts may be in the same compartment of the vehicle, or in different compartments of the vehicle. For example, one or more items included in the multi-item order may be placed in sub-compartment 1070a of FIG. 10 and one or more items included in the multi-item order may be placed in sub-compartment 1070c of FIG. 10.

Once items in the multi-item order are placed in appropriate sub-compartments, a compartment or computer control system of the vehicle may identify the sub-compartments as being associated with the multi-item order in a step 1121. That is, a compartment control system of the vehicle may substantially track the sub-compartments which contain items included in the multi-item order. The compartment control system may communicate with compartment inserts to identify sub-compartments, and may use sensing technology to identify the item or items in each sub-compartment. For example, using a weight sensor, a barcode scanner, and/or a camera associated with a compartment insert may enable a compartment control system to identify items in a sub-compartment of the compartment insert. In one embodiment, the compartment control system may cause the sub-compartments that contain items of the multi-item order to effectively be associated with each other such that the compartment control system may lock and unlock the sub-compartments substantially simultaneously. For example, sub-compartments that contain items from a single multi-item order may be arranged to be locked together such that a single authorization process may effectively cause the sub-compartments associated with a single multi-item order to substantially all be accessed.

After the compartment control system identifies the sub-compartments associated with the multi-item order, the vehicle delivers the multi-item order to the customer in a step 1125. One method of delivering the multi-item order to the customer will be discussed below with respect to FIG. 12. The method of preparing a vehicle to deliver a multi-item order is completed once the vehicle delivers the multi-item order.

Figure 12:
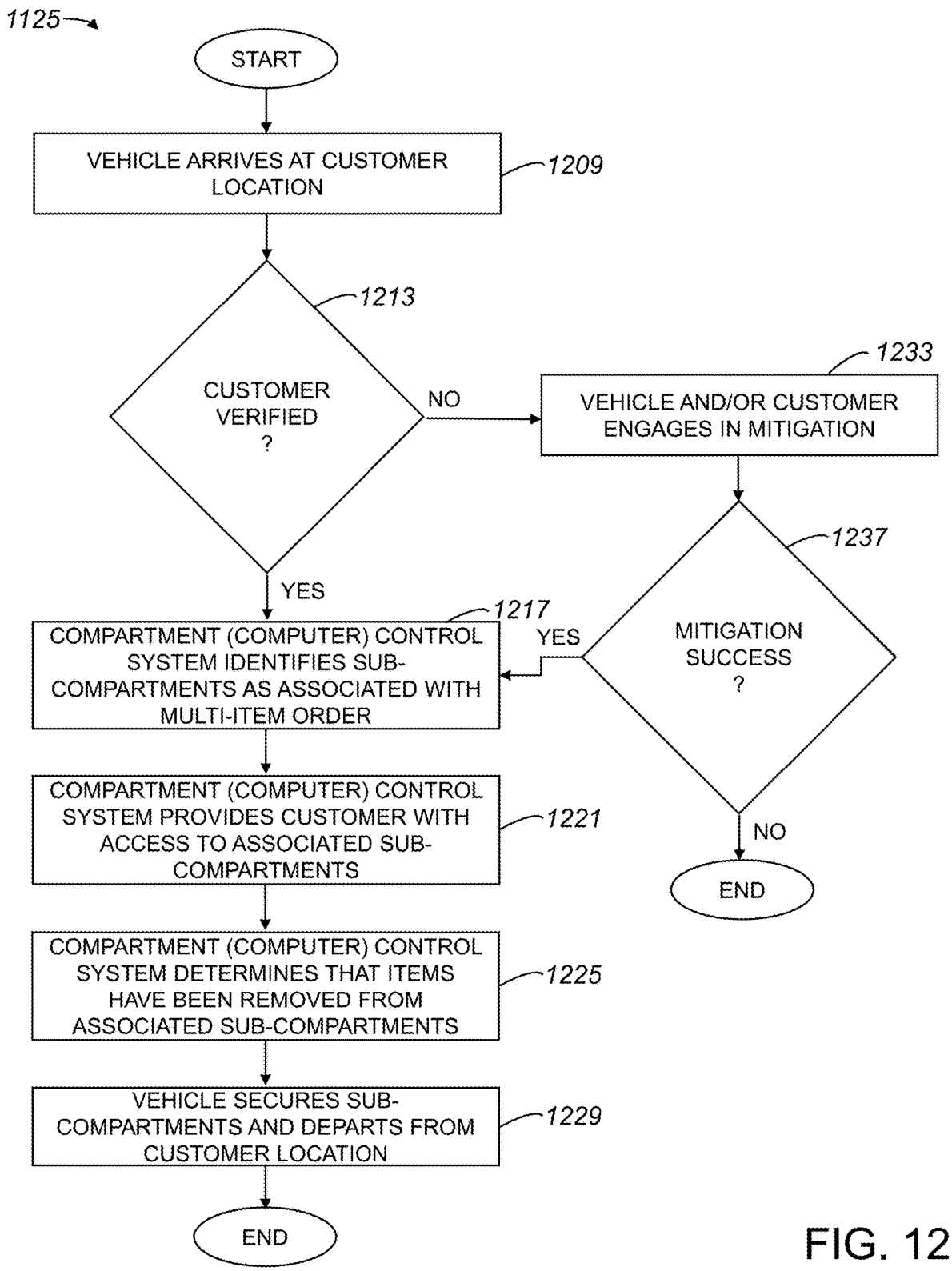
FIG. 12 is a process flow diagram which illustrates a method of delivering a multi-item order to a customer, e.g., step 1125 of FIG. 11, in accordance with an embodiment.

FIG. 12 is a process flow diagram which illustrates a method of delivering a multi-item order to a customer, e.g., step 1125 of FIG. 11, in accordance with an embodiment. Method 1125 of delivering a multi-item order begins at a step 1209 in which a vehicle, e.g., an autonomous delivery vehicle, arrives at a customer location. Once the vehicle arrives at the customer location, a determination is made in a step 1213 as to whether the customer is verified or authenticated. That is, it is determined whether the customer is authorized to receive the delivery. Any suitable method may generally be used to verify the customer. For example, verifying the customer may include verifying that the customer is who he or she claims to be by checking an ID or performing facial recognition, determining whether the customer is in possession of a correct password, and/or determining whether the customer is able to respond to questions with answers which would only be known by the customer.

If the determination in step 1213 is that the customer is verified, the indication is that the customer may receive the multi-item order. Accordingly, in a step 1217, a compartment control system of the vehicle identifies the sub-compartments associated with the multi-item order. Then, in a step 1221, the compartment control system provides the customer with access to the sub-compartments associated with the multi-item order. In one embodiment, the compartment control system may unlock and/or unlatch the sub-compartments substantially simultaneously such that the customer may obtain his or her items from the sub-compartments. It should be appreciated that while the sub-compartments associated with the multi-item order may be unlocked, other sub-compartments may remain locked.

After the customer accesses the sub-compartments to obtain his or her items, the compartment control system determines in step 1225 that the items have been removed from the sub-compartments. Such a determination may be made using any suitable method. Suitable methods include, but are not limited to including, using sensors in the sub-compartments to determine when the items have been removed, determining whether an indication is received from the customer, and/or determining whether a particular amount of time has elapsed.

Once the compartment control system determines that the items have been removed from the sub-compartments, the vehicle secures the sub-compartments and departs from the customer location in a step 1229. The method of delivering a multi-item order to a customer is completed upon the vehicle departing the customer location.

Returning to step 1213, if it is determined that the customer is not verified or authorized, the implication is that the customer is not to be provided with access to the sub-compartments containing his or her order. As such, process flow moves from step 1213 to a step 1233 in which the vehicle and/or the customer engage in mitigation. Mitigation may include, but is not limited to including, implementing different processes to attempt to authenticate the customer, facilitating interactions between the customer and a customer service representative, and/or otherwise troubleshooting reasons why the customer is unable to be verified.

A determination is made in a step 1237 as to whether the mitigation was successful. If the determination is that the mitigation was successful, process flow proceeds to step 1217 in which the compartment control system identifies sub-compartments associated with the multi-item order. Alternatively, if the determination in step 1237 is that the mitigation was not successful, the indication is that the customer may not be provided with access to the multi-item order, and the method of delivering a multi-item order to a customer is effectively terminated.

Compartment inserts may be arranged to be readily swapped in and out of compartments of a vehicle. The ability to efficiently swap compartment inserts increases the efficiency at which a vehicle may be configured and, hence, enhances overall operation efficiency associated with the vehicle. To facilitate the ability to swap or otherwise switch compartment inserts installed in a compartment of a vehicle may be furthered, in one embodiment, by having a substantially uniform interfaces in compartments and corresponding substantially uniform interfaces in compartment inserts. That is, compartment inserts of different types may be configured to have substantially the same connection or installation interfaces such that substantially any compartment insert may be used in any compartment with a corresponding uniform connection interface.

Figure 13A:
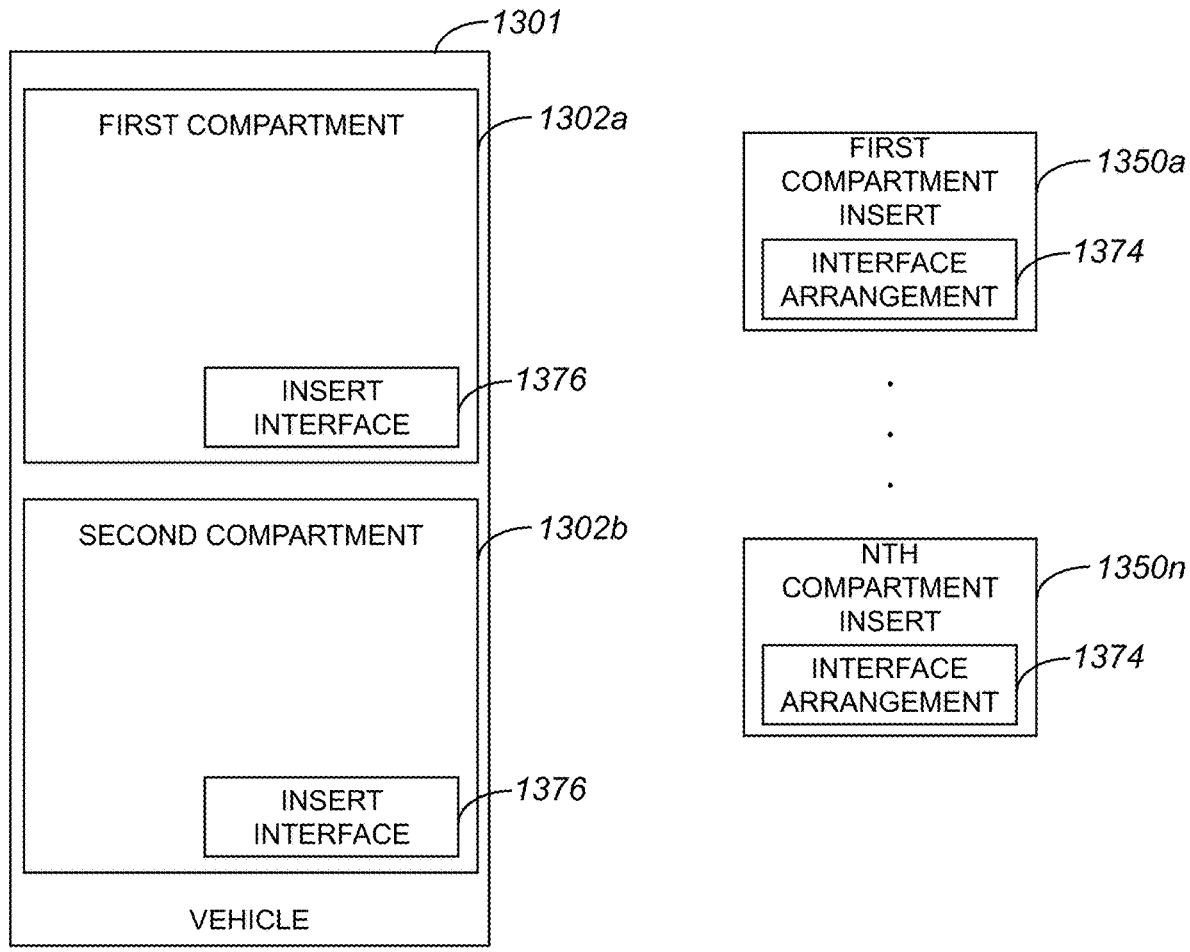
FIGS. 13A-C are diagrammatic representations of a vehicle and multiple compartment inserts which are configured to be contained in any compartment of the vehicle in accordance with an embodiment.
Figure 13B:
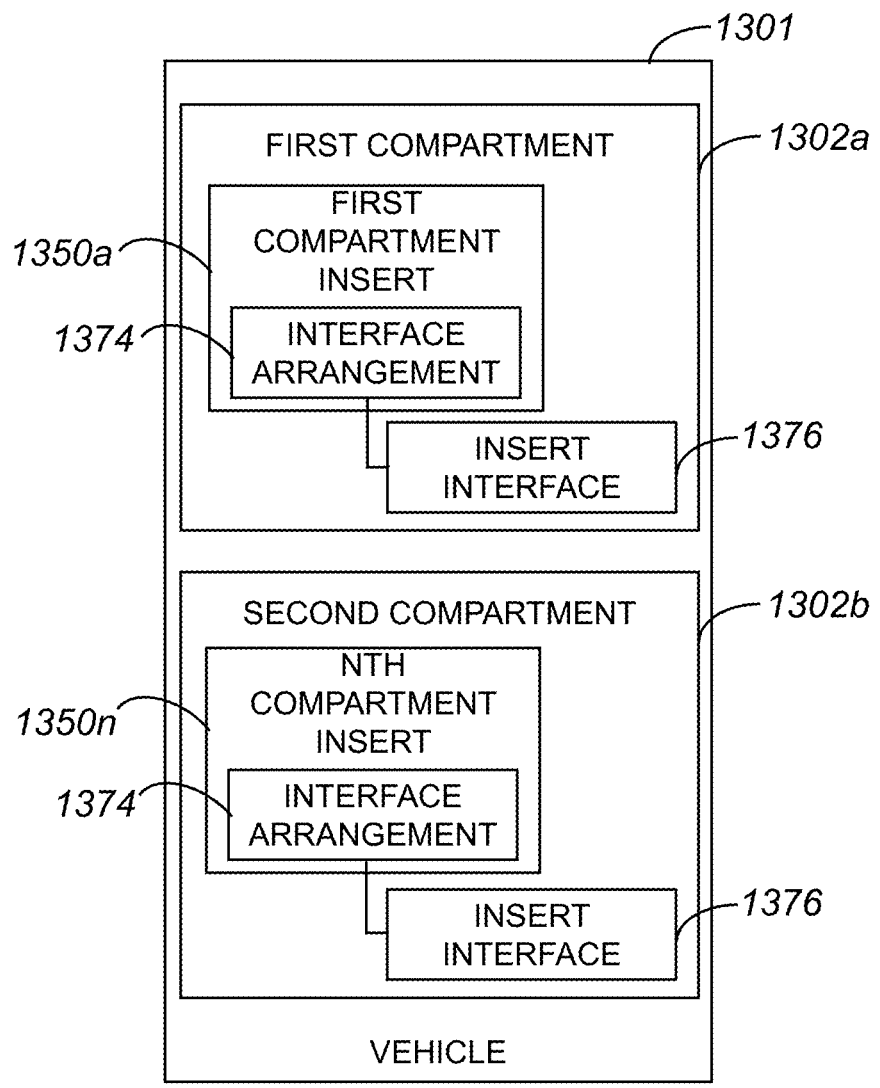
Figure 13C:
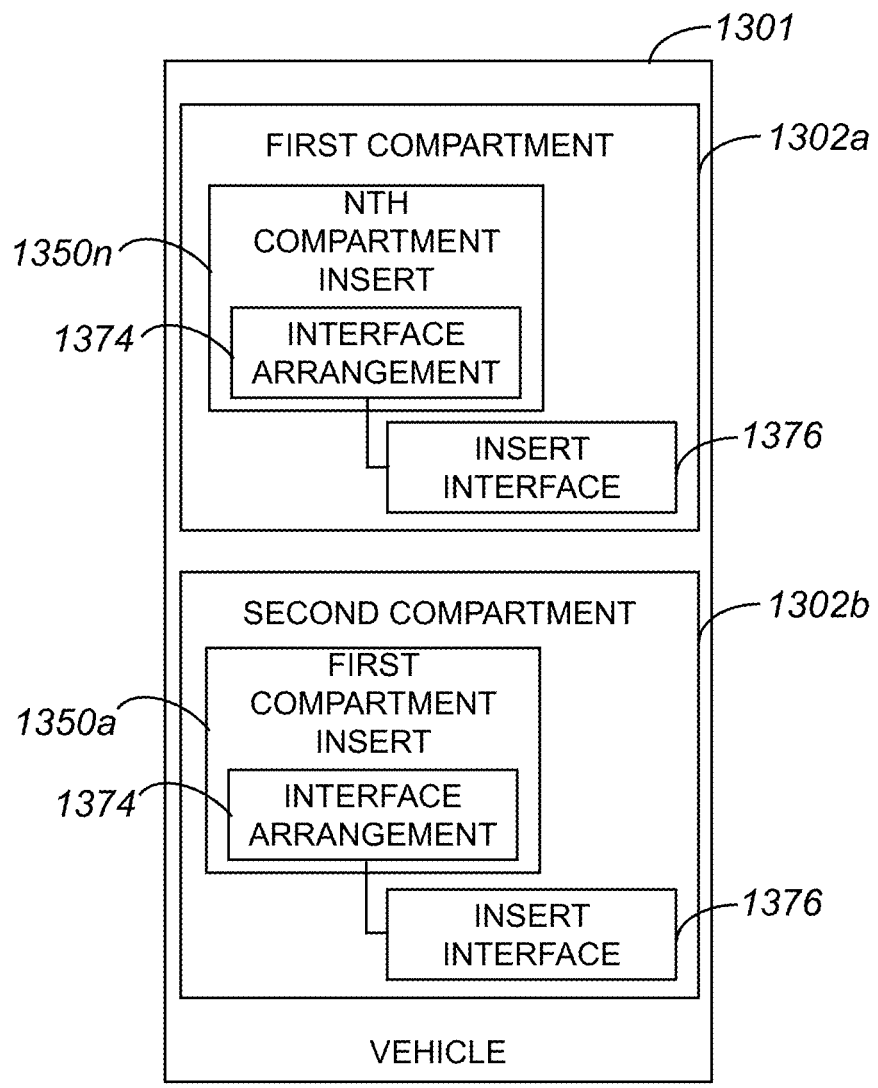

FIGS. 13A-C are diagrammatic representations of a vehicle and multiple compartment inserts which are configured to be contained in substantially any compartment of the vehicle in accordance with an embodiment. As shown in FIG. 13A, vehicle 1301 includes at least a first compartment 1302a and a second compartment 1302b. Multiple compartment inserts 1350a, 1350n may be arranged to be installed in compartments 1302a, 1302b. In one embodiment, compartment inserts 1350a, 1350n have different functionalities or capabilities.

Figure 14:
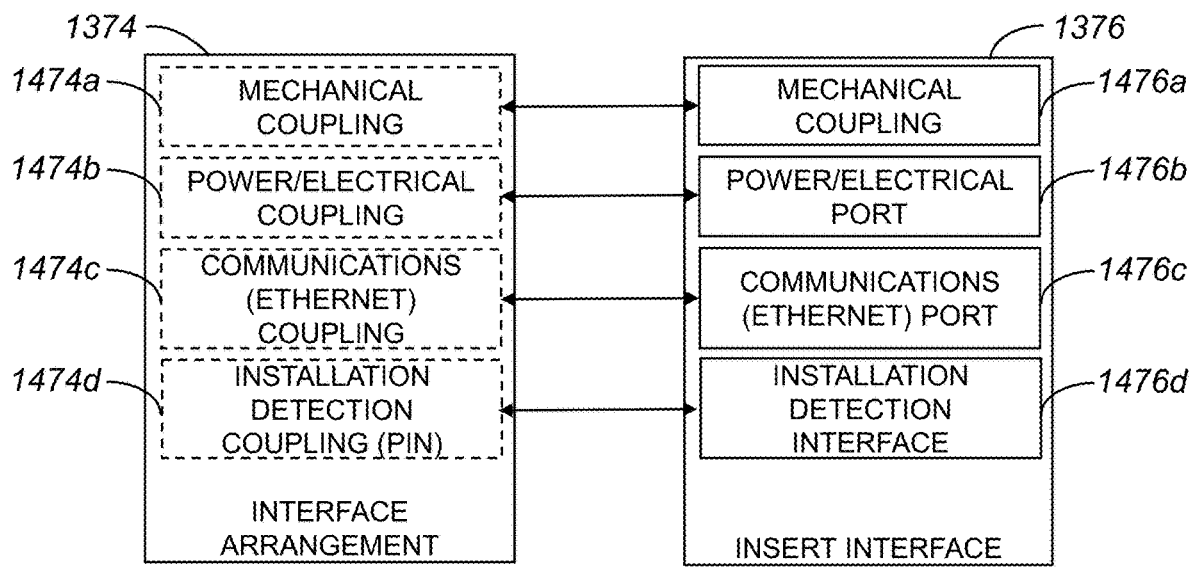
FIG. 14 is a diagrammatic representation of mechanical and physical connections between a n insert interface of compartment of a vehicle and an interface arrangement of a compartment insert in accordance with an embodiment.

First compartment 1302a and second compartment 1302b each include an insert or coupling interface 1376. Typically, insert interfaces 1376 are positioned on surfaces of compartments 1302a, 1302b. Insert interface 1376, which will be discussed in more detail below with respect to FIG. 14, is configured to enable compartment inserts 1350a, 1350n to be physically installed in compartments 1302a, 1302b and, in some embodiments, enables compartment inserts 1350a, 1350n to communicate with vehicle 1301.

First compartment insert 1350a and nth compartment insert 1350n each include an interface arrangement 1374 that is configured to be physically coupled to insert interface 1376. Interface arrangement 1374, which will be discussed in more detail below with respect to FIG. 14, is configured to effectively mate with insert interface 1376. Typically, compartment inserts 1350a, 1350n have external surfaces, e.g., external surfaces of bodies or shells of compartment inserts 1350a, 1350n, on which interface arrangements 1374 are at least partially supported.

Because compartments 1302a, 1302b each include insert interface 1376 which is arranged to mate with, or to otherwise interface with or connect to, interface arrangement 1374 of compartment inserts 1350a, 1350n, compartment inserts 1350a, 1350n may be readily installed in either compartment 1302a, 1302b. As shown in FIG. 13B, first compartment insert 1350a may be installed in first compartment 1302a, and nth compartment insert 1350n may be installed in second compartment 1302b. Interface arrangement 1374 of first compartment insert 1350a is coupled to insert interface 1376 of first compartment 1302a, and interface arrangement 1374 of second compartment insert 1350n is coupled to insert interface 1376 of second compartment 1302b As interface arrangement 1374 is the same in compartment inserts 1350a, 1350n, and insert interface 1376 is the same in compartments 1302a, 1302b, compartment insert 1350a may instead be installed in second compartment 1302b, and compartment insert 1350n may instead be installed in first compartment 1302a, as shown in FIG. 13C. Interface arrangement 1374 of first compartment insert 1350a is coupled to insert interface 1376 of second compartment 1302b, and interface arrangement 1374 of first compartment insert 1350a is coupled to insert interface 1376 of second compartment 1302b Interface arrangement 1374 and insert interface 1376 may be configured to include a variety of different coupling mechanisms and/or interfaces, and generally cooperate to provide connections between compartment inserts 1350a, 1350n and compartments 1302a, 1302b. FIG. 14 is a diagrammatic representation of connections included in insert interface 1376 and included in interface arrangement 1374 accordance with an embodiment.

In one embodiment, insert interface 1376 includes a mechanical coupling 1476a, a power/electrical port 1476b, a communications port 1476c, and an installation detection interface 1476d, while interface arrangement 1374 includes an optional mechanical coupling 1474a, an optional power/electrical coupling 1474b, an optional communications coupling 1474c, and an optional installation detection coupling 1474d. It should be appreciated that interface arrangement 1374 generally includes at least one coupling 1474a-d. In one embodiment, interface arrangement 1374 includes mechanical coupling 1474a, power/electrical coupling 1474b, communications coupling 1474c, and installation detection coupling 1474d. Interface arrangement 1374 and insert interface 1376 may be arranged to be physically coupled together.

Mechanical coupling 1476a is configured to couple to optional mechanical coupling 1474a to for a substantially physical, or mechanical connection. In one embodiment, mechanical coupling 1476a may be a mechanical fastener that is configured to engage mechanical coupling 1474a to securely hold a compartment insert within a compartment of a vehicle. In another embodiment, mechanical coupling 1474a may be an exterior of a compartment insert and arranged to engage mechanical coupling 1476a, which may be a feature within a compartment.

Power/electrical port 1476b is configured to provide power to an optional power/electrical coupling 1474b. It should be appreciated that in some embodiments, such as embodiments in which a compartment insert includes a dedicated power source such as a battery or does not need power, power/electrical coupling 1474b may either not be part of a compartment insert or may be embodied as a ground connection. Through power/electrical coupling 1474b, power may be obtained via power/electrical port 1476b.

Communications port 1476c may be any suitable port that supports communications, as for example Ethernet communications. Optional communications coupling 1474c may enable communications signals to be sent and received by a compartment insert. For example, through a connection between communications port 1476c and communications coupling 1474c, a vehicle may control a compartment insert and the compartment insert may provide status updates to the vehicle. In one embodiment, communications coupling 1474c may be utilized to enable a compartment insert to communicate with a customer.

Installation detection interface 1476d is configured to detect when a compartment insert has been installed in a compartment. Optional installation detection coupling 1474d, which may include an electrical pin, may come into contact with installation detection interface 1476d to effectively signal that a compartment insert has been installed. When installation detection coupling 1474d engages with installation detection interface 1476*d*, a compartment control system of a vehicle may determine that an installation of a compartment insert has occurred, and may effectively initiate a determination of whether the compartment insert is smart, as described above with respect to FIG. 9. In one embodiment, installation detection coupling 1474*d* may be an electrical pin, and installation detection interface 1476*d* may include a socket, e.g., an electrical socket, that is configured to receive the electrical pin.

In one embodiment, when interface arrangement 1374 does not include substantially all couplings 1474*a-d*, couplings 1474*a-d* that are effectively not live or not in use may be grounded or otherwise connected to ground. When interface arrangement 1374 has a particular footprint, or configuration of couplings 1474*a-d*, false couplings or otherwise non-functional couplings may be included in interface arrangement 1374 as a physical substitute for couplings 1474*a-d* which are not included.

Although only a few embodiments have been described in this disclosure, it should be understood that the disclosure may be embodied in many other specific forms without departing from the spirit or the scope of the present disclosure. By way of example, although power has been described as being provided to compartment inserts which utilize power by an autonomous vehicle, each compartment insert may instead have an onboard power source. That is, a compartment insert may be arranged to provide its own power such that the compartment insert is not provided with power from an autonomous vehicle. In one embodiment, a compartment insert may include a battery that is arranged to provide power for the compartment insert. In another embodiment, a compartment insert may be powered by a battery, with backup power provided by an autonomous vehicle if the battery runs out of power.

It should be understood that various structures may be used in conjunction with compartment inserts without departing from the spirit or the scope of the disclosure. For instance, structures may be included in compartments to facilitate securing compartment inserts in desired positions within the compartments. Structures that have thermal insulation capabilities may also be provided in compartments to further insulate compartment inserts from each other.

Compartment inserts may be arranged such that a first compartment insert loaded in a compartment may effectively support the functionality of a second compartment insert loaded in the compartment. By way of example, a second compartment insert may be a coffee station and the first compartment insert may be a reservoir which contains water that supplies the coffee station through a coupling between the first and second compartment inserts.

As described above with respect to FIG. 5, compartment inserts may be arranged to store goods or items, but are not limited to being arranged to store goods. For example, compartment inserts may be arranged to provide power and to provide a speaker. In some embodiments, compartment inserts may be arranged to provide services, e.g., a compartment insert may be a microwave oven that may be used to heat food removed from a refrigerator or a freezer compartment, or to provide support functionality for an autonomous vehicle, e.g., a compartment insert may provide backup power to power the autonomous vehicle in an emergency.

Various types of compartment inserts may generally be stored at a depot, warehouse, maintenance location, or any other suitable location. Other suitable locations may include, but are not limited to including, grocery stores, retail stores, restaurants, service-oriented stores such as dry-cleaning stores, etc. The compartment inserts may be swapped in and out of an autonomous vehicle at substantially any location. Loading and unloading compartment inserts may be an automated process, e.g., performed by a robot or a series of robots, or may be a manual process, e.g., performed by a human. It should be appreciated that a process of swapping compartments inserts in and out of an autonomous vehicle may generally include cleaning the compartment inserts and inspecting the compartment inserts for damage. Cleaning the compartment inserts may include sanitizing the compartment inserts.

To enhance the experience of a customer receiving a delivery from an autonomous vehicle that utilizes or otherwise carries compartment inserts, compartment inserts may be color coded or otherwise marked to facilitate an identification of the types of good that may be transported in the compartment inserts. As described above, compartment inserts which keep items warm may be color coded as red, while compartment inserts which keep items cool and/or frozen may be color coded as blue. The identification of which types of items are contained in a compartment insert may also be facilitated by providing compartment inserts with transparent doors or windows which allow the items carried within the compartment inserts to be readily viewed.

In one embodiment, a compartment control system may be configured such that once a customer with an order is verified or authenticated, compartment control system may open compartment doors and unlock doors on compartment inserts which are associated with the order. That is, when a customer is authenticated, doors on compartments of a vehicle which contain components of the order may be opened, and doors on compartment inserts which hold the order may be substantially automatically unlatched so efficiently provide the customer with access to the items in his or her order.

Any suitable mechanism may generally be arranged to enable doors of compartment inserts, and/or doors of sub-compartments of the compartment inserts, to be latched and unlatched. For example, such doors may include, but are not limited to including, magnetic locks which may be controlled by a compartment control system and mechanical fasteners which may be controlled by a compartment control system. In one embodiment, a compartment control system may reduce current provided to a magnetic lock to cause the magnetic lock to disengage. In another embodiment, a compartment control system may control a solenoid which may cause a mechanical fastener to release.

While a compartment of a vehicle has generally been described as including a communications connection, a power connection, a mechanical coupling, and an installation detection interface, it should be appreciated that a compartment of a vehicle may include other connections, couplings, and/or interfaces. For example, a compartment may include an exhaust port that allows exhaust from a compartment insert to be removed from the compartment, and/or a drainage port that enables fluids generated by a compartment insert to be drained out of the compartment.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure.

The embodiments may be implemented as hardware, firmware, and/or software logic embodied in a tangible, i.e., non-transitory, medium that, when executed, is operable to perform the various methods and processes described above.

That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A method, the method comprising:
    obtaining an order from a customer, the order including at least a first item and a second item;
    causing loading the order into a vehicle suitable for delivering the order to the customer, the vehicle including a first compartment and a second compartment, the first compartment being arranged to contain a first compartment insert that includes at least a first sub-compartment and at least a second sub-compartment, the second compartment being arranged to contain a second compartment insert that includes at least a third sub-compartment and a fourth sub-compartment, wherein loading the order into the vehicle includes loading the first item into the first sub-compartment and loading the second item into the third sub-compartment, and wherein the first compartment has a first insert interface, and wherein the first compartment insert has a first interface arrangement, the first insert interface including an installation detection interface and the first interface arrangement including an installation detection coupling;
    installing the first compartment insert in the first compartment, wherein installing the first compartment insert in the first compartment includes coupling the first insert interface with the first interface arrangement, and wherein installing the first compartment insert in the first compartment causes an electric pin of the installation detection coupling to engage with an electric circuit of the installation detection interface to close the electric circuit;
    identifying the first compartment insert as being installed in the first compartment when the installation detection coupling engages with the installation detection interface;
    associating the first sub-compartment and the third sub-compartment with the order; and
    controlling the first sub-compartment and the third sub-compartment using a compartment control system, the compartment control system being associated the vehicle, wherein controlling the first sub-compartment and the third sub-compartment includes at least latching the first sub-compartment and the third sub-compartment to secure the order.

2. The method of claim 1 wherein the first insert interface includes a first mechanical coupling, a power/electrical port, and a communications port, and wherein the first interface arrangement includes at least a second mechanical coupling arranged to engage the first mechanical coupling.

3. The method of claim 1 wherein the first insert interface includes a first mechanical coupling, a power/electrical port, and a communications port, and wherein the first interface arrangement includes at least a power/electrical coupling arranged to engage the power/electrical port.

4. The method of claim 1 wherein the first insert interface includes a first mechanical coupling, a power/electrical port, and a communications port, and wherein the first interface arrangement includes at least a communications interface arranged to interface with the communications port.

5. A method, the method comprising:
    detecting, through a detection interface of a vehicle, an installation of a first compartment insert in a first compartment of the vehicle, wherein detecting the installation includes determining when the detection interface is in contact with a second interface of the first compartment insert;
    determining, after detecting the installation of the first compartment insert, whether the first compartment insert is capable of transmitting information to the vehicle;
    obtaining the information from the first compartment insert when it is determined that the first compartment insert is capable of transmitting the information to the vehicle; and
    identifying a type associated with the first compartment insert from the information.

6. The method of claim 5 wherein the first compartment insert includes a first communications interface and the vehicle includes a vehicle communications interface, and wherein obtaining the information from the first compartment insert includes obtaining the information through the first communications interface and the vehicle communications interface.

7. The method of claim 6 wherein the vehicle includes a compartment control system, the method further including:
    providing, from the compartment control system via the vehicle communications interface and the first communications interface, a control signal to the first compartment insert.

8. The method of claim 5 wherein the first compartment insert has the type and a unique insert identifier arranged to uniquely identify the first compartment insert, the method further including:
    identifying the unique insert identifier from the information, wherein the type is one selected from a group including a purpose served by the first compartment insert and an indication of whether the first compartment insert is securable.

9. A compartment insert comprising:
    a body, the body having an exterior surface; and
    an interface arrangement, the interface arrangement including at least one coupling arranged to enable the apparatus to be installed in a compartment of a vehicle, the at least one coupling including an installation detection coupling arranged to indicate when the apparatus is installed in the compartment, the interface arrangement being supported on the exterior surface, the compartment of the vehicle includes an insert interface that includes an installation detection interface that is an electrical pin, and wherein the installation detection coupling is arranged to physically engage the electrical pin to indicate when the apparatus is installed in the compartment.

10. The compartment insert of claim 9 wherein the interface arrangement includes a mechanical coupling, the mechanical coupling being arranged to engage the insert interface to physically secure the apparatus in the compartment, and wherein the electrical pin is configured to engage an electrical circuit included in the installation detection interface.

11. The compartment insert of claim 9 wherein the interface arrangement includes a communications coupling, the communications coupling being arranged to engage the insert interface to communicably couple the compartment insert to the vehicle.

12. The compartment insert of claim 9 wherein the interface arrangement includes a power coupling, the power coupling being arranged to engage the insert interface to enable power to be provided from the vehicle to the compartment insert.

13. The compartment insert of claim 9 wherein the body defines an interior space, and wherein the interface arrangement is configured to obtain a control signal from the vehicle, the control signal being arranged to control at least one condition within the interior space, the compartment insert further including
    at least a first storage medium, the first storage medium configured to encode one or more bits that identify a type of the compartment insert, the type being one selected from a group including an indication of a purpose served by the compartment insert, an indication of whether the compartment insert is securable, and an indication of a size of the compartment insert.

14. The compartment insert of claim 9 wherein the body includes a door, the door including a latch, wherein the interface arrangement is configured to obtain a control signal from the vehicle, the control signal being arranged to control the latch.

* * * * *